US012682234B2

(12) United States Patent　　　　(10) Patent No.:　US 12,682,234 B2
Ezrielev et al.　　　　　　　　　　(45) Date of Patent:　　Jul. 14, 2026

(54) SYSTEM AND METHOD FOR PREVENTING INTRODUCTION OF POISONED TRAINING DATA TO ARTIFICIAL INTELLIGENCE MODELS

(71) Applicant: Dell Products L.P., Round Rock, TX (US)

(72) Inventors: Ofir Ezrielev, Be'er Sheva (IL); Amihai Savir, Newton, MA (US); Tomer Kushnir, Omer (IL)

(73) Assignee: Dell Products L.P., Round Rock, TX (US)

( * ) Notice: Subject to any disclaimer, the term of this patent is extended or adjusted under 35 U.S.C. 154(b) by 752 days.

(21) Appl. No.: 18/147,774

(22) Filed: Dec. 29, 2022

(65) Prior Publication Data

US 2024/0220790 A1　　Jul. 4, 2024

(51) Int. Cl.
G06N 3/08　　　　(2023.01)
G06N 3/048　　　(2023.01)

(52) U.S. Cl.
CPC .............. G06N 3/08 (2013.01); G06N 3/048 (2023.01)

(58) Field of Classification Search
CPC ........... G06N 3/08; G06N 20/00; G06N 3/048
See application file for complete search history.

(56) References Cited

U.S. PATENT DOCUMENTS

| | | | |
|---|---|---|---|
| 10,936,969 B2 | 3/2021 | Patel et al. | |
| 11,087,170 B2 | 8/2021 | Malaya | |
| 11,487,963 B2 | 11/2022 | Angel | |
| 11,544,501 B2 | 1/2023 | Dong | |
| 11,636,726 B2 | 4/2023 | Purohit | |

(Continued)

FOREIGN PATENT DOCUMENTS

| | | |
|---|---|---|
| WO | 2020040777 A1 | 2/2020 |
| WO | 2021213626 A1 | 10/2021 |

(Continued)

OTHER PUBLICATIONS

Paduraru, Ciprian, Marius-Constantin Melemciuc, and Bogdan Ghimis. "Fuzz Testing with Dynamic Taint Analysis based Tools for Faster Code Coverage." ICSOFT 19 (2019): 82-93. (Year: 2019).

(Continued)

*Primary Examiner* — Yuk Ting Choi
(74) *Attorney, Agent, or Firm* — WOMBLE BOND DICKINSON (US) LLP

(57)　　　　　　　ABSTRACT

Methods and systems for managing artificial intelligence (AI) models are disclosed. To manage AI models, an instance of an AI model may not be re-trained using training data determined to be too similar to previously used training data. By doing so, malicious attacks intending to shift the AI model in a particular direction using poisoned training data may be prevented. To do so, a candidate training data set may be analyzed prior to performing re-training of an instance of an AI model using the candidate training data set. The analysis may result in a score. If the score exceeds a score threshold, the candidate training data set may be considered to contain poisoned training data. If the score does not exceed the score threshold, the candidate training data set may be accepted as usable to train an instance of the AI model.

20 Claims, 12 Drawing Sheets

(56) References Cited

U.S. PATENT DOCUMENTS

| | | | |
|---|---|---|---|
| 11,645,515 B2 | 5/2023 | Angel | |
| 11,689,566 B2 | 6/2023 | Baracaldo-Angel | |
| 11,785,024 B2 | 10/2023 | Karam | |
| 11,797,672 B1 | 10/2023 | Beveridge | |
| 11,829,193 B2 | 11/2023 | Shukla | |
| 11,847,217 B2 | 12/2023 | Healy | |
| 11,921,903 B1 | 3/2024 | Beveridge | |
| 11,991,240 B2 | 5/2024 | Ezrielev et al. | |
| 12,032,541 B2 | 7/2024 | Hasabnis | |
| 12,126,640 B2 | 10/2024 | Woodworth | |
| 12,143,405 B2 | 11/2024 | Chen Kaidi | |
| 12,175,008 B2 | 12/2024 | Ezrielev et al. | |
| 2017/0177860 A1 | 6/2017 | Suarez | |
| 2018/0255023 A1 | 9/2018 | Whaley | |
| 2019/0377873 A1 | 12/2019 | Murphy | |
| 2019/0384790 A1* | 12/2019 | Bequet | G06N 3/084 |
| | | | 707/705 |
| 2020/0019821 A1* | 1/2020 | Baracaldo-Angel | G06F 18/10 |
| | | | 707/705 |
| 2020/0050945 A1 | 2/2020 | Chen | |
| 2020/0057857 A1* | 2/2020 | Roytman | G06N 20/20 |
| | | | 707/705 |
| 2020/0082097 A1 | 3/2020 | Poliakov | |
| 2020/0082270 A1 | 3/2020 | Gu | |
| 2020/0134374 A1 | 4/2020 | Oros | |
| 2020/0244674 A1* | 7/2020 | Arzani | G06N 20/00 |
| | | | 707/705 |
| 2021/0073685 A1 | 3/2021 | Veshchikov | |
| 2021/0081831 A1 | 3/2021 | Angel | |
| 2021/0209512 A1 | 7/2021 | Gaddam et al. | |
| 2021/0303695 A1 | 9/2021 | Grosse | |
| 2021/0374247 A1 | 12/2021 | Sultana | |
| 2021/0398020 A1 | 12/2021 | Ahmad et al. | |
| 2022/0166782 A1* | 5/2022 | Zoldi | H04L 63/1416 |
| | | | 707/705 |
| 2022/0179840 A1 | 6/2022 | Chatterjee | |
| 2022/0368706 A1* | 11/2022 | Tang | H04L 63/1425 |
| | | | 707/705 |
| 2022/0414492 A1 | 12/2022 | Jezewski | |
| 2023/0004654 A1 | 1/2023 | Jurzak | |
| 2023/0079112 A1 | 3/2023 | Cheruvu | |
| 2023/0134218 A1* | 5/2023 | Semenov | G06N 3/08 |
| | | | 382/159 |
| 2023/0148116 A1 | 5/2023 | Stokes, III | |
| 2023/0164162 A1 | 5/2023 | Lee | |
| 2023/0222385 A1 | 7/2023 | Shimizu | |
| 2023/0274003 A1* | 8/2023 | Liu | G06N 3/094 |
| | | | 726/26 |
| 2023/0274192 A1 | 8/2023 | Wang | |
| 2024/0015019 A1 | 1/2024 | Sneider | |
| 2024/0020580 A1* | 1/2024 | Brower | G06N 3/045 |
| | | | 707/705 |
| 2024/0048977 A1* | 2/2024 | Marzban | G06N 20/20 |
| | | | 707/705 |
| 2024/0119153 A1 | 4/2024 | Ludmir | |
| 2024/0364534 A1 | 10/2024 | Ezrielev | |
| 2025/0053664 A1* | 2/2025 | Cameron | G06F 21/552 |
| | | | 707/705 |
| 2025/0055762 A1 | 2/2025 | Walker | |

FOREIGN PATENT DOCUMENTS

| | | |
|---|---|---|
| WO | 2022/216142 A1 | 10/2022 |
| WO | 2023111287 A1 | 6/2023 |

OTHER PUBLICATIONS

Jiang, Bingchen, and Zhao Li. "Defending Against Backdoor Attack on Graph Nerual Network by Explainability." arXiv preprint arXiv: 2209.02902, 10 pages, (Year: 2022).

Raghavan, Vijay, Thomas Mazzuchi, and Shahram Sarkani. "Discover Artificial Intelligence: An improved real time detection of data poisoning attacks in deep learning vision systems", 17 pages, Discover 2022, (Year: 2022).

Anastasovski, Goce, "Classification of Malicious Web Traffic" (2013), Graduate Theses, Dissertations, and Problem Reports 153 (118 Pages).

Joshi, Naveen, "Is the Data Used for Training Your Machine Learning Model Safe?", Technology for You, Jul. 28, 2022, <https://www.technologyforyou.org/is-the-data-used-for-training-your-machine-learning-model-safe/> (3 Pages).

Wang, Siruo et al., "Methods for correcting inference based on outcomes predicted by machine learning." Proceedings of the National Academy of Sciences 117.48 (2020): 30266-30275. (10 Pages).

Rauschmayr, Nathalie et al., "Detecting and analyzing incorrect model predictions with Amazon SageMaker Model Monitor and Debugger", AWS Machine Learning Blog, Jul. 9, 2020, <https://aws.amazon.com/blogs/machine-learning/detecting-and-analyzing-incorrect-model-predictions-with-amazon-sagemaker-model-monitor-and-d%E2%80%A6/> (13 Pages).

Higgins, Kelly Jackson, "Honeypot Stings Attackers With Counterattacks", Dark Reading, Mar. 26, 2013, <https://www.darkreading.com/vulnerabilities-threats/honeypot-stings-attackers-with-counterattacks> (4 Pages).

Susmelj, Igor, "The Data you Don't Need: Removing Redundant Samples", Towards Data Science, Mar. 19, 2020, https://towardsdatascience.com/the-data-you-don-t-need-removing-redundant-samples-6bfd07c1516c> (10 Pages).

"The Machine Learning Minefield—How to Avoid Getting Hit by Machine Learning Poisoning" retrieved from <https://ayc-data.com > Mar. 22, 2022 > data-poisoning> on May 1, 2025 (10 pages).

Zhang et al., "FL Detector: Defending Federated Learning Against Model Poisoning Attacks via Detecting Malicious Clients", Available at https://arxiv.org/abs/2207.092009 (Year: 2022), (11 pages).

Tran et al., "Manipulating Machine Learning Poisoning Attacks and Countermeasures for Regression Learning", 32nd Conference on Neural Information Processing Systems (NeurIPS 2018), Montreal, Canada; 2018, pp. 1-11 (Year: 2018), (11 pages).

Zeng et al., "CNNComparator: Comparative Analytics of Convolutional Neural Networks", arXiv: 1710.05285v1 [cs.LG] Oct. 15, 2017, pp. 1-5 (Year: 2017), (5 pages).

Hendrycks et al., "Natural Adversarial Examples", arXiv:1907.07174v4[cs.LG] Mar. 4, 2021; pp. 1-16 (Year:2021), (16 pages).

Xu et al., "Feature Squeezing: Detecting Adversarial Examples in Deep Neural Networks", In Network and Distributed Systems Security Symposium (NDSS) 2018, San Diego, Feb. 2018; arXiv: 1704.01155v2 [cs. CV] Dec. 5, 2017; pp. 1-15 (Year: 2018), (15 pages).

Lao; "Reorienting Machine Learning Education Towards Tinkerers and ML-Engaged Citizens", Doctoral Dissertation; Massachusetts Institute of Technology, Department of Electrical Engineering and Computer Science; 2020; pp. 165-167 (Year: 2020), (223 pages).

* cited by examiner

Cluster
400

Cluster 400

SYSTEM AND METHOD FOR PREVENTING INTRODUCTION OF POISONED TRAINING DATA TO ARTIFICIAL INTELLIGENCE MODELS

FIELD

Embodiments disclosed herein relate generally to artificial intelligence (AI) models. More particularly, embodiments disclosed herein relate to systems and methods to manage instances of AI models.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
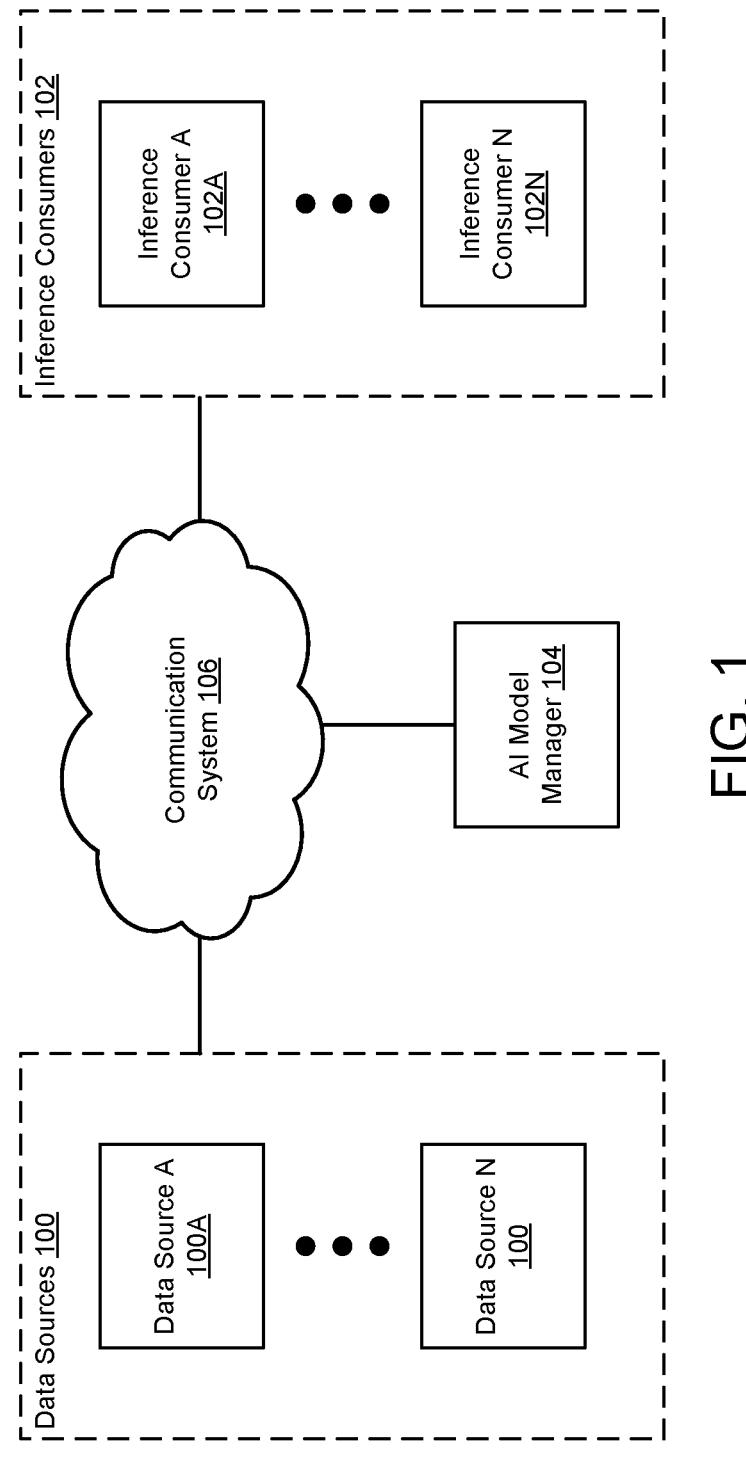
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing AI models. Trained AI models may provide computer-implemented services (e.g., inference generation) for downstream consumers (e.g., inference consumers). To manage trained AI models, a data processing system may, over time, update AI models through training using training data. However, if poisoned training data is introduced to the AI model, the AI model may become untrustworthy (e.g., the AI model may be tainted by the poisoned training data). Inferences generated using the tainted AI model may also be untrustworthy or inaccurate.

Once it has been discovered that an AI model has been tainted with poisoned training data, the model may require re-training to remove the influence of the poisoned training data, and any or all inferences generated using the tainted AI model may be untrustworthy. Training an AI model may be a computationally expensive process and may require the use of a limited amount of computing resources that may otherwise be used for inference generation. In other words, computing resources spent re-training AI models may interrupt inference consumption and/or other types of computer-implemented services that may otherwise be provided using the computing resources dedicated to re-training.

To reduce computing resources spent re-training AI models exposed to poisoned training data, training data sets may be analyzed prior to use for re-training an instance of an AI model. A malicious attacker may attempt to bias the AI model in pursuit of a goal. To do so, the malicious attacker may introduce similar poisoned data values into candidate training data sets. By doing so, the AI model may be more likely to make predictions in accordance with those poisoned data values. To detect potentially poisoned training data, a candidate training data set (e.g., a data set intended to be used to re-train the AI model) may be analyzed prior to re-training.

To analyze the candidate training data set, the candidate training data set may be compared to a historical training data set (e.g., a data set including all data values previously used to train instances of the AI model) to determine a score. In a first example, the candidate training data set may be compared to the historical training data set via a cluster analysis. In a second example, the candidate training data set may be compared to the historical training data set via determining similarity measures between values in each data set.

The score obtained as a result of the analysis may indicate a likelihood that the candidate training data set includes poisoned training data. A higher score may indicate a higher likelihood that the candidate training data set includes poisoned training data. In addition, a higher score may indicate that one or more data values in the candidate training data set is similar enough to one or more data values in the historical training data set to cause suspicion. If the score exceeds a score threshold, the candidate training data may be treated as including poisoned training data. If the score does not exceed the score threshold, the candidate training data may be treated as not including poisoned training data and may be accepted as usable to train the AI model.

By doing so, embodiments disclosed herein may provide a system for managing AI models in which the introduction of poisoned training data may be computationally efficiently mitigated. By not re-training the AI model when candidate training data is determined too similar to previously used training data, attacks intended to shift inference generation by the AI model in a particular direction may be avoided. Consequently, the computational resources typically associated with re-training a tainted AI model may be reduced, leaving more resources for inference generation.

In an embodiment, a method of managing an artificial intelligence (AI) model is provided. The method may include: obtaining a candidate training data set usable to update an instance of the AI model; identifying a historical training data set, the historical training data set being obtained prior to the candidate training data set and the historical training data set already having been used to train the instance of the AI model; performing an analysis of the candidate training data set and the historical training data set to obtain a score reflecting a likelihood that the candidate training data set includes poisoned training data; making a first determination regarding whether the score exceeds a score threshold; in a first instance of the first determination in which the score exceeds the score threshold, treating the candidate training data set as including poisoned training data; and in a second instance of the first determination in which the score does not exceed the score threshold, treating the candidate training data set as not including poisoned training data.

A higher score indicates a higher likelihood that the candidate training data set includes poisoned training data.

Performing the analysis may include: performing a cluster analysis of the historical training data set to obtain a set of clusters; identifying a first data value of the candidate training data set; making a second determination regarding whether the first data value falls within the set of clusters; in a first instance of the second determination in which the first data value falls within the set of clusters: increasing the score; and in a second instance of the second determination in which the first data value does not fall within the set of clusters: decreasing the score; and approving the first data value for AI model training purposes.

Making the second determination may include: for each of the clusters of the set of clusters: making a comparison between the first data value and a bounding area of a respective cluster to determine whether the first data value falls within the respective cluster; and in an instance of the comparison in which the first data value falls within the respective cluster, concluding that the first data value falls within the set of clusters.

The bounding area may be defined by a point and a radius that extends about the point thereby establishing the bounding area.

Performing the analysis may include: identifying a first data value of the candidate training data set; obtaining a similarity measure between the first data value and each data value of the historical training data set to obtain a set of similarity measures; making a second determination regarding whether each similarity measure of the set of similarity measures exceeds a similarity measure threshold; in a first instance of the second determination in which at least a portion of the set of similarity measures exceeds the similarity measure threshold, increasing the score; and in a second instance of the second determination in which at least a portion of the set of similarity measures does not exceed the similarity measure threshold, decreasing the score.

The similarity measure may include one selected from a group consisting of: a Euclidean distance; a cosine similarity; and a Manhattan distance.

Treating the candidate training data as including poisoned training data may include one selected from a list consisting of: removing the candidate training data set from consideration as training data for the AI model; treating the candidate training data set as being part of a malicious attack; discarding the candidate training data set; identifying a data source of the candidate training data set; and treating the data source of the candidate training data set as a potentially malicious data source.

Treating the candidate training data set as not including poisoned training data may include one selected from a list consisting of: updating the instance of the AI model using the candidate training data to obtain a new instance of the AI model; and adding the candidate training data set to the historical training data set to obtain an updated historical training data set.

The method may also include: prior to obtaining the candidate training data set: making an identification that a re-training condition is met for the AI model, wherein the candidate training data set is obtained in response to the identification.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize AI models as part of the provided computer-implemented services.

The AI models may include, for example, linear regression models, deep neural network models, and/or other types of AI models. The AI models may be used for various purposes. For example, the AI models may be trained to recognize patterns, automate tasks, and/or make decisions.

The computer-implemented services may include any type and quantity of computer-implemented services. The computer-implemented services may be provided by, for example, data sources 100, AI model manager 104, inference consumers 102, and/or any other type of devices (not shown in FIG. 1). Any of the computer-implemented services may be performed, at least in part, using AI models and/or inferences obtained with the AI models.

Data sources 100 may obtain (i) training data usable to train AI models, and/or (ii) ingest data that is ingestible into trained AI models to obtain corresponding inferences.

To obtain AI models, AI model manager 104 may (i) initiate the training of an instance of an AI model using the training data, and/or (ii) obtain inferences using a trained AI model instance and the ingest data. Both of these tasks may consume computing resources. AI model manager 104 may have access to a finite number of computing resources (e.g., processors, memory modules, storage devices, etc.), and/or may determine at any point in time which computing resources should be allocated to training an instance of the AI model, using the AI model to generate inferences, and/or any other task related to AI models.

Inference consumers 102 may provide, all or a portion, of the computer-implemented services. When doing so, inference consumers 102 may consume inferences obtained by AI model manager 104 (and/or other entities using AI models managed by AI model manager 104). However, if inferences from AI models are unavailable, then inference consumers 102 may be unable to provide, at least in part, the computer-implemented services, may provide less desirable computer-implemented services, and/or may otherwise be impacted in an undesirable manner. For example, if AI model manager 104 is providing inferences relied upon by inference consumers 102, then inference consumers 102 may be deprived of the inferences when the limited computing resources of AI model manager 104 are allocated to training an AI model instance rather than obtaining inferences.

Over time, new versions of the AI model may be obtained. The new versions of the AI models may be obtained, for example, due to requests from inference consumers 102, acquisition of additional training data that may improve the accuracy of inferences provided by the AI models, and/or for other reasons.

To obtain the AI models, existing AI models may be used as a basis for new AI models thereby leveraging the existing resource expenditures used to obtain the existing AI models. For example, updating instances of the AI models may be obtained through training as more training data is obtained (e.g., incremental learning).

Training of AI models may be computationally costly because training may require significant resource expenditures. However, the introduction of malicious or poisoned training data can in turn, poison the new AI model instance, any inferences obtained from the poisoned AI model instance, and further poison other AI model instances derived from the new AI model instance. A malicious attacker may generate similar poisoned data values to bias the AI model in a particular direction. Therefore, similarities between candidate training data sets and a historical training data set may indicate an increased likelihood of the presence of poisoned training data values.

In general, embodiments disclosed herein may provide methods, systems, and/or devices for managing AI models. The AI models may be managed in a manner that allows for the impact of poisoned training data to be identified and remediated in a computationally efficient manner. By doing so, the system may be more likely to be able to provide desired computer-implemented services due to improved access to computing resources.

To manage a trained instance of an AI model, the system of FIG. 1 may include AI model manager 104. AI model manager 104 may (i) obtain an AI model, (ii) obtain a training dataset or an ingest dataset, (iii) obtain a trained AI model instance, (iv) obtain an inference from the trained AI model instance, (v) provide access to the inference to other entities, (vi) update the AI model over time when update conditions indicate that the AI model should be updated, and/or (vii) generate snapshots for the AI model as it is updated over time.

In order to obtain a trained AI model instance, AI model manager 104 may obtain an AI model and a training dataset. The training dataset may be obtained through multiple data sources 100. Data sources 100 may include any number of data sources (e.g., 100A, 100N). For example, an AI model may be used for facial recognition; that is, identifying a person from an image or video. In this example, the AI model may be a deep learning model type and data sources may include multiple social media platforms. A training dataset may be created by collecting images or video of a person who has already been identified by a user. The training dataset may then be used to train an instance of the AI model.

Further, in order to obtain an inference from the trained AI model instance, other data may be collected from the same data sources 100 or another data source. Continuing with the above example, another data source 100 may be a security camera. The ingest dataset may include images or video of the same person not identified by a user. An inference (e.g., an identification of the person) may be obtained from the trained instance of the AI model after ingesting the ingest dataset, and the inference may be distributed to inference consumers 102.

Update conditions may indicate that the AI model should be updated when a candidate training data set is determined to not include poisoned training data. To do so, an analysis may be performed using the candidate training data set and a historical training data set to obtain a score. The score may indicate a likelihood that the candidate training data set includes poisoned training data. For example, the analysis may include performing a cluster analysis of the historical training data set to obtain a set of clusters. Data values from the candidate training data set may be compared to the set of clusters. If a data value of the candidate training data set falls within the set of clusters, the data value may be considered too similar to the historical training data set to be used to re-train the AI model and the score may be increased. However, if a data value of the candidate training data set falls outside the set of clusters, the data value may be considered acceptable for re-training the AI model and the score may be decreased. This process may continue until each data value of the candidate training data set is evaluated to obtain the score. The score may be compared to a score threshold. If the score exceeds the score threshold, the candidate training data set may be treated as including poisoned training data. If the score does not exceed the score threshold, the candidate training data set may be treated as not including poisoned training data and, therefore, the update condition may be satisfied.

The snapshots generated throughout the life of the AI model may include full snapshots and/or incremental snapshots. A full snapshot of an AI model at a given time may include any or all information required to rebuild the AI model for the given time (e.g., the entire AI model structure, all neuron weights, all connections, etc.). However, an incremental snapshot of an AI model at a given time may only include a subset of the information stored in the full snapshot (e.g., only the neuron weights that have changed since the last full snapshot). Using incremental snapshots may improve efficiency as they may use fewer computing resources (e.g., data transfer and/or data storage) than a full snapshot. Generating snapshots of the AI model over time may allow for the impact of poisoned training data to be computationally efficiently mitigated if the AI model is updated using poisoned training data.

If the AI model is updated using poisoned training data and to mitigate the impact of the poisoned training data, AI model manager 104 may obtain a poisoned data notification. When a poisoned data notification is identified, AI model manager may use the snapshots to (i) revert an existing AI model instance to a previous AI model instance that is not tainted by the poisoned training data, (ii) update the previous AI model instance to obtain an updated AI model instance that is not tainted by the poisoned training data, (iii) identify poisoned inferences provided by the existing AI model inference (and/or previous versions that were also tainted by the poisoned training data), (iv) obtain replacement inferences using the updated AI model instance, (v) delete the identified poisoned inferences, and/or (vi) notify inference consumers 102 of the poisoned inferences.

By doing so, embodiments disclosed herein may reduce inference supply interruptions to inference consumers 102 by reducing computing resources used for retraining poisoned AI models.

Inference consumers 102 may include any number of inference consumers (e.g., 102A, 102N). Inference consumers 102 may include businesses, individuals, or computers that may use the inference data to improve and/or automate decision-making. In the above example, the inference consumer may be law enforcement attempting to identify a person, and/or the inference consumer may offer computer-implemented services for businesses in order to determine which products may appeal to a potential customer.

While the example supplied is with respect to AI facial recognition, it will be appreciated that an AI model may be used to achieve other types of goals.

When performing its functionality, one or more of AI model manager 104, data sources 100, and inference consumers 102 may perform all, or a portion, of the methods and/or actions shown in FIGS. 2A-4C.

Any of AI model manager 104, data sources 100, and inference consumers 102 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

Any of the components illustrated in FIG. 1 may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of AI model manager 104 and any of the data sources 100 and inference consumers 102).

While illustrated in FIG. 1 as included a limited number of specific components, a system in accordance with an embodiment may include fewer, additional, and/or different components than those illustrated therein.

The system described in FIG. 1 may be used to reduce the computational cost for mitigating the impact of poisoned training data used train AI models. The following operations described in FIGS. 2A-2D may be performed by the system in FIG. 1 when providing this functionality.

Figure 2A:
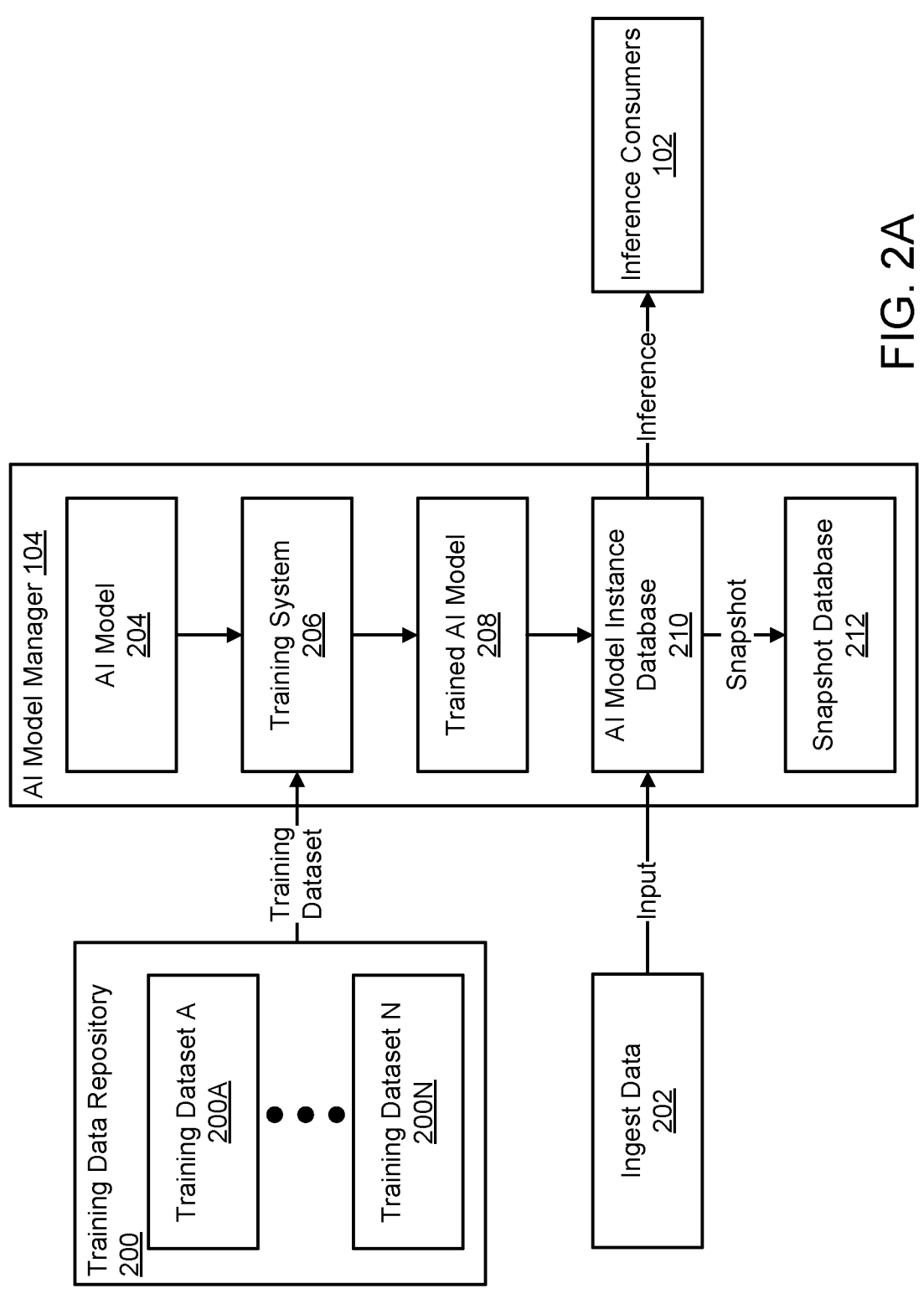
FIG. 2A shows a data flow diagram illustrating an AI model management system in accordance with an embodiment.

FIG. 2A shows a data flow diagram in accordance with an embodiment. The data flow diagram may illustrate the generation and use of AI models in a system similar to that of FIG. 1. As noted with respect to FIG. 1, the AI models may be used to obtain inferences, which may be used to provide computer-implemented services. For example, inference consumers 102 may consume facial recognition services for images or video of an unidentified person. Facial recognition services may be provided by using AI models that have been trained to identify a person based on facial attributes.

As discussed with respect to FIG. 1, training data used for training AI models may be obtained from any number of data sources 100. Training data may be stored in training data repository 200. Training data repository 200 may include any number of training datasets (e.g., 200A, 200N).

Training data repository 200 may include data that defines an association between two pieces of information (e.g., which may be referred to as "labeled data"). For example, in the context of facial recognition, training data repository 200 may include images or video of a person who has already been identified by a user. The relationship between the images or video and the identification may be a portion of labeled data. Any of the training datasets (e.g., 200A) from training data repository 200 may relate the facial attributes of a person to their identifier (e.g., name, username, etc.) thereby including any number of portions of labeled data.

Data sources 100 may also provide ingest data 202. Ingest data 202 may be a portion of data for which an inference is desired to be obtained. Ingest data 202 may not be labeled data and, thus, an association for ingest data 202 may not be known. For example, returning to the facial recognition services example, ingest data 202 may include images of an unidentified person. Ingest data 202 may be used by AI model manager 104 to obtain the name of the unidentified person (e.g., through ingestion by an AI model).

AI model manager 104 may provide inferences for ingest data, such as ingest data 202. To do so, AI model manager 104 may include AI model 204 and training system 206. AI model 204 may be trained by training system 206 using a training dataset (e.g., training dataset 200A). For example, training system 206 may employ supervised learning using a training dataset that includes sample input data along with its desired output data (e.g., the pair being labeled data).

Once trained, trained AI model 208 may attempt to map the sample input data to the desired output data, as well as make inferences based on ingest data 202 that may differ from the sample data used to train trained AI model 208. In the context of the facial recognition services example, trained AI model 208 may be a trained facial recognition AI model, trained to map the facial attributes captured in images of a person to the name of the person.

To provide facial recognition services, AI model manager 104 may train any number of AI models which may generate inferences usable to identify persons in images. To manage the trained AI models, the trained AI models (e.g., including trained AI model 208 and/or other trained AI models) may be stored in AI model instance database 210. AI model instance database 210 may include any number of trained AI model instances (e.g., trained AI model 208, other trained AI models that are not shown in FIG. 2A).

To generate inferences using the trained AI models, AI model instance database 210 (and/or other entities not shown) may receive ingest data 202. Ingest data 202 may be used to select one or more trained AI models to use to infer the identity of persons depicted in ingest data 202.

Once selected, ingest data 202 may be input to a trained AI model instance to generate an inference. AI model manager 104 may obtain the inference, which may be provided to inference consumers 102. In the facial recognition example, an image of an unidentified person may be input to the trained facial recognition AI model, the name of the unidentified person may be obtained by AI model manager 104, and the name of the unidentified person may be provided to an inference consumer such as a law enforcement agency.

Over time, the AI models of AI model instance database 210 may need to be updated for a variety of reasons. For example, the trained AI models may become inaccurate, may not provide desired types of inferences, etc. Consequently, the trained AI models of AI model instance database 210 may be replaced and/or updated.

To reduce the likelihood of replacement or updating of trained AI models resulting in undesired outcomes (e.g., due to poisoning), snapshots for the trained AI models may be obtained. AI model manager 104 may obtain a snapshot of a trained AI model instance from AI model instance database 210. The snapshot may be stored by snapshot database 212. The snapshot may be stored by snapshot database 212 by: sending the snapshot to snapshot database 212 and storing the snapshot in a non-transitory storage medium.

Snapshot database 212 may include any number of snapshots of AI model instances. The snapshots of the AI model instances may include information regarding the structure of an AI model instance, information regarding inferences obtained from the AI model instance, and/or information regarding the training datasets used to train the AI model instance.

Thus, as illustrated in FIG. 2A, the system of FIG. 1 may provide inferences using trained AI models. However, as noted above, if the trained AI models are poisoned then the trained AI models may no longer be trustworthy for inference generation. To manage inference generation when poisoned trained AI models are identified, the snapshots of snapshot database 212 may be used to computationally efficiently restore inference generation functionality, manage tainted inferences, and/or otherwise mitigate the impact of poisoned training data.

Figure 2B:
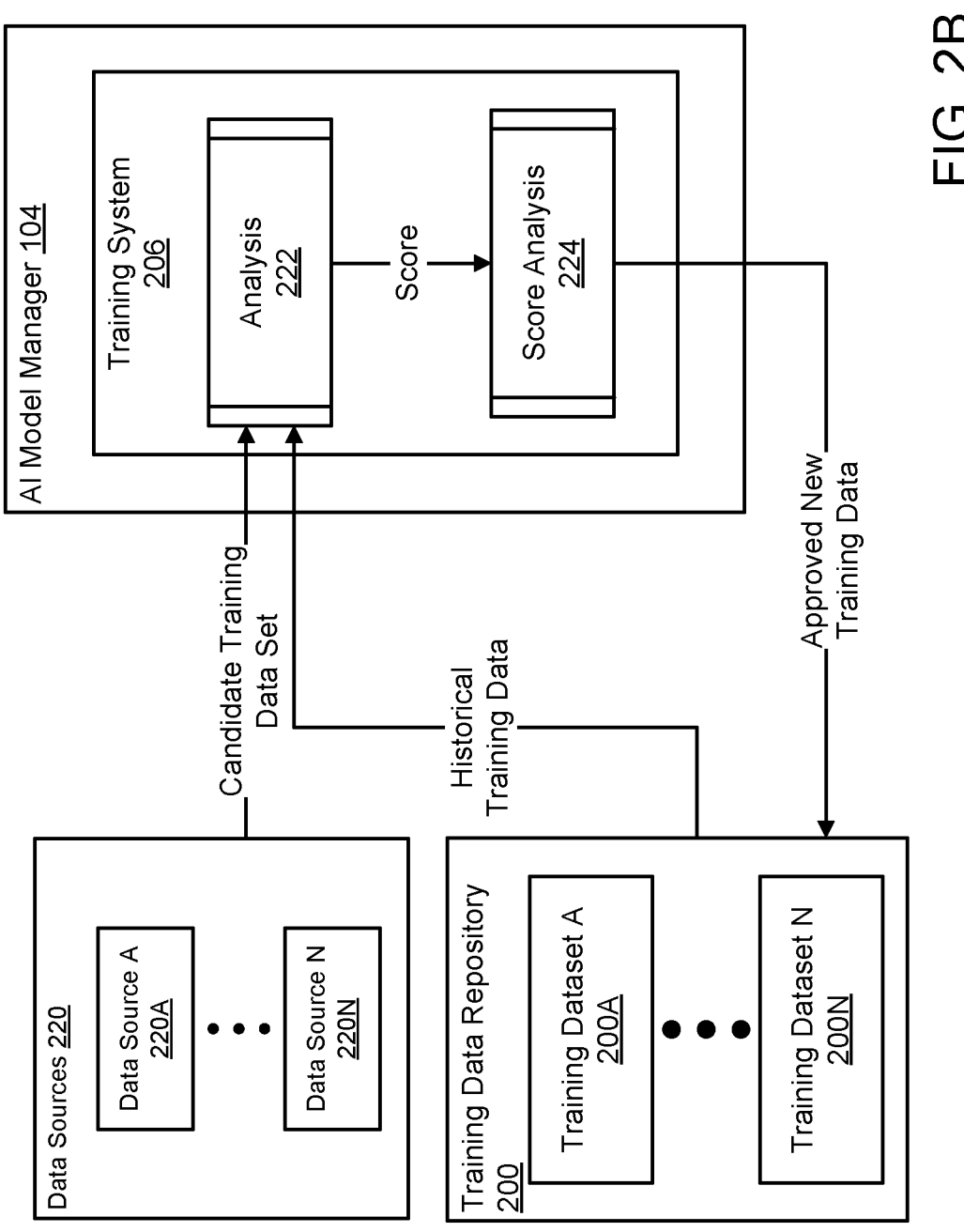
FIG. 2B shows a data flow diagram illustrating an AI model management system performing an analysis of candidate training data in accordance with an embodiment.

Turning to FIG. 2B, if re-training of the AI model is triggered (e.g., due to a time duration passing, inferences with low accuracy being obtained, and/or other conditions being met), training system 206 may obtain a candidate training data set from data sources 220. Data sources 220 may include any number of data sources 220A-220N and may be similar to any of data sources 100. The candidate data set may include any quantity or type of data usable to re-train an AI model and/or as ingest for a trained AI model to generate inferences. Training system 206 may perform analysis process 222 to obtain a score. The score may reflect a likelihood that the candidate training data set includes poisoned training data. A higher score may indicate a higher likelihood that the candidate training data set includes poisoned training data set. Therefore, a higher score may also indicate an unacceptable degree of similarity (indicated by a downstream consumer and/or any other entity) between at least a portion of the candidate training data set and the historical training data set. The score may include, for example, a numerical representation of the result of analysis process 222, a percentage indicating similarity between the two training data sets, and/or may include any other representation of the result of analysis process 222.

In a first example, analysis process 222 may include a cluster analysis. The cluster analysis may be performed on the historical training data set to obtain a set of clusters (refer to FIGS. 4A-4C for an example and additional details regarding cluster analysis). Following the cluster analysis, each data value of the candidate training data set may be evaluated to determine whether any of the data values fall within the set of clusters. If any of the data values are determined to fall within the set of clusters, the score may be increased. If any of the data value are determined to fall outside the set of clusters, the score may be decreased.

Figure 3A:
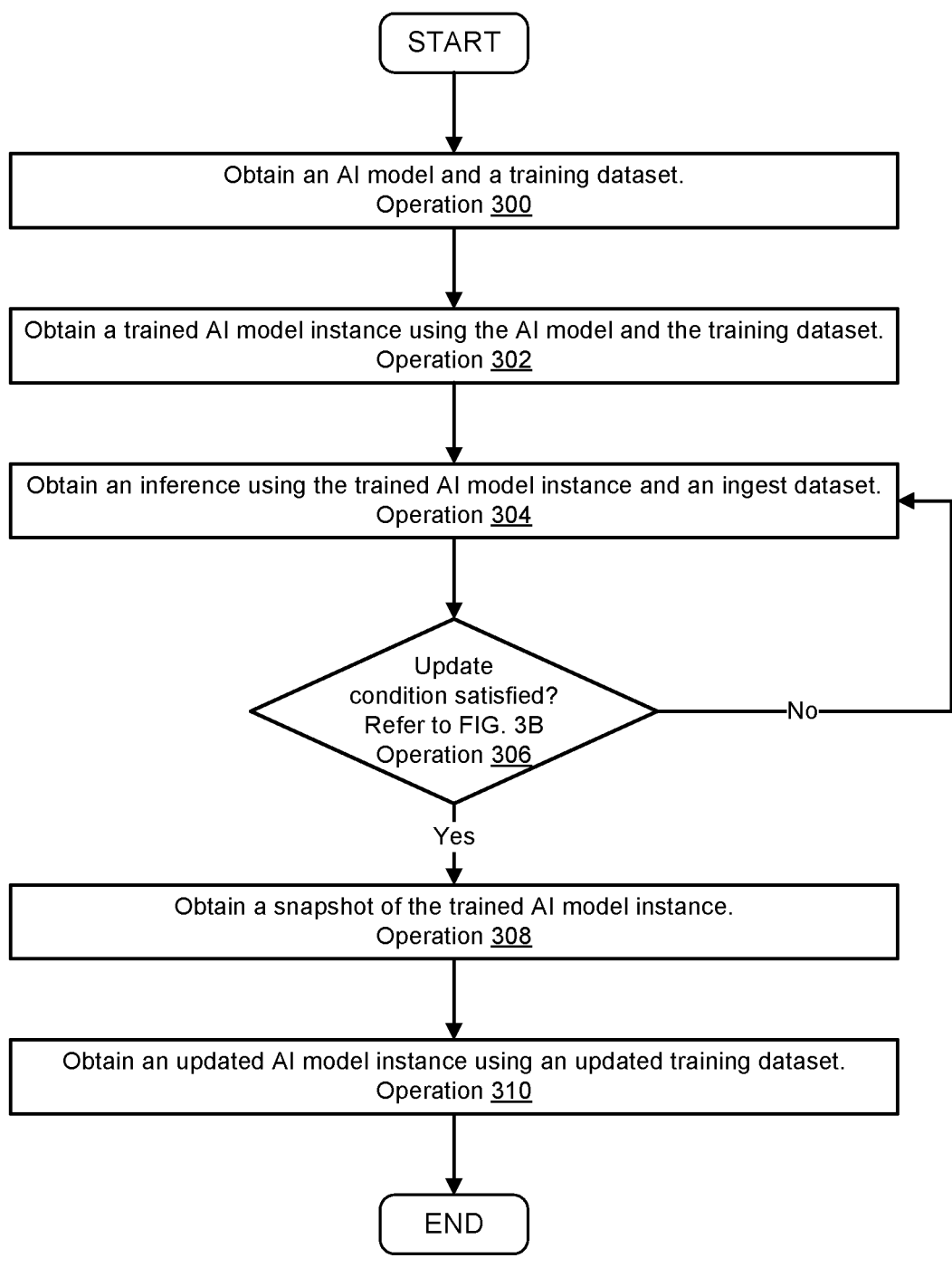
FIG. 3A shows a flow diagram illustrating a method of updating an AI model instance in accordance with an embodiment.
Figure 3B:
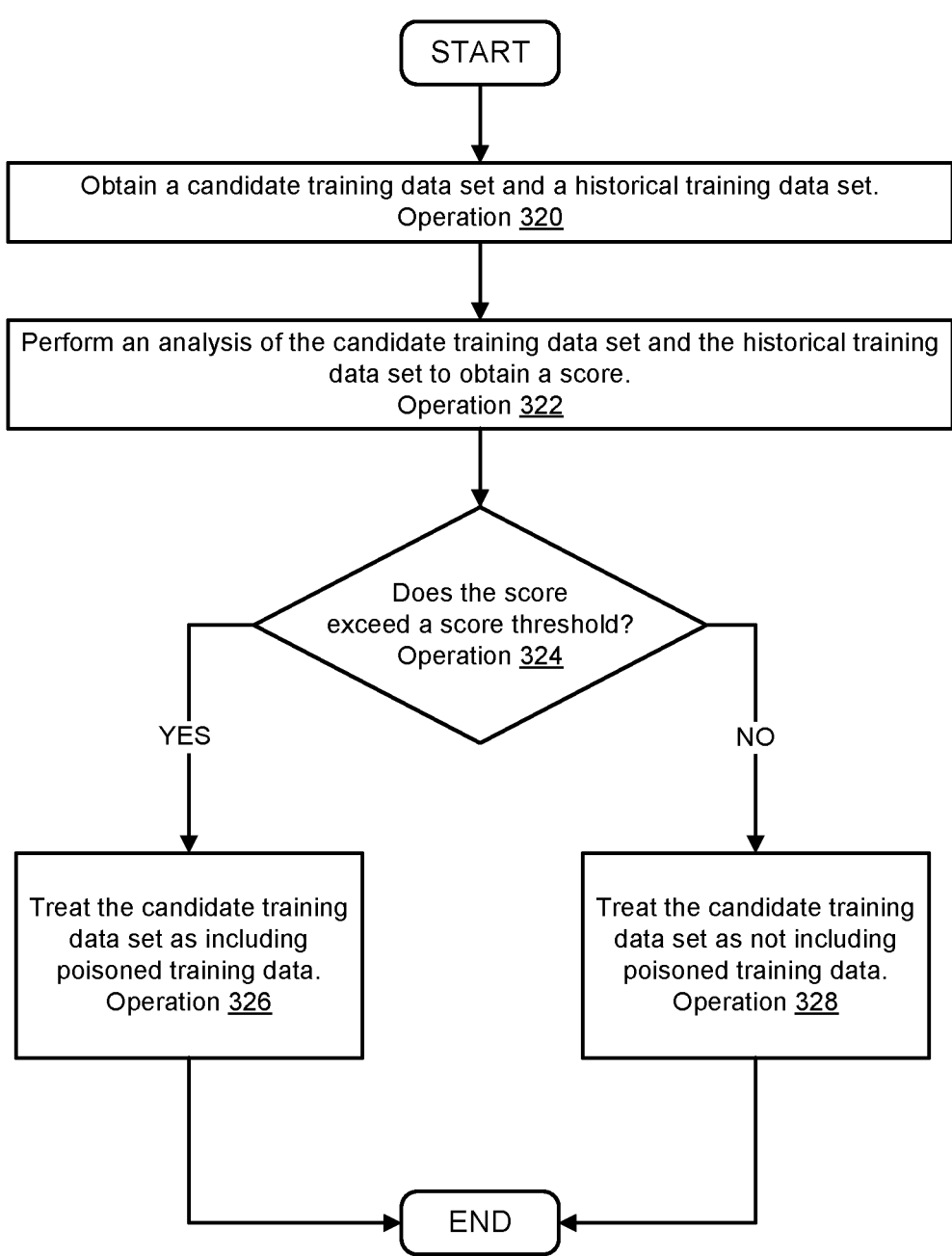
FIG. 3B shows a flow diagram illustrating a method of determining whether to update an instance of the AI model in accordance with an embodiment.

In a second example, analysis process 222 may include obtaining a similarity measure between each data value of the candidate training data set and each data value of the historical training data set. The similarity measure may include, for example, a Euclidean distance, a cosine similarity, a Manhattan distance, and/or any other method of measuring the distance and/or similarity between two data values. As a result, a set of similarity measures may be obtained. If at least a portion of the set of similarity measures exceeds a similarity measure threshold, the score may be increased. If at least a portion of the set of similarity measures does not exceed the similarity threshold, the score may be decreased. Refer to FIG. 3B for additional details regarding analysis process 222.

Training system 206 may then use the score to perform score analysis 224. Score analysis 224 may include comparing the score to a score threshold. The score threshold may be determined by a downstream consumer, AI model manager 104, and/or any other entity throughout the distributed environment. If the score exceeds the score threshold, the candidate training data set may be treated as including poisoned training data. If the candidate training data set is treated as including poisoned training data (not shown), the candidate training data may be: (i) removed from consideration as training data for the AI model, (ii) treated as being part of a malicious attack, and/or (iii) discarded. In addition, the data source of the candidate training data set may be identified and treated as a potentially malicious data source. Other actions may be performed in response to the candidate training data set being treated as including poisoned training data without departing from embodiments disclosed herein.

If the candidate training data set is treated as not including poisoned training data, the candidate training data may be re-labeled as approved new training data. Approved new training data may be transmitted to training data repository 200 to be used to update an instance of the AI model.

Figure 2C:
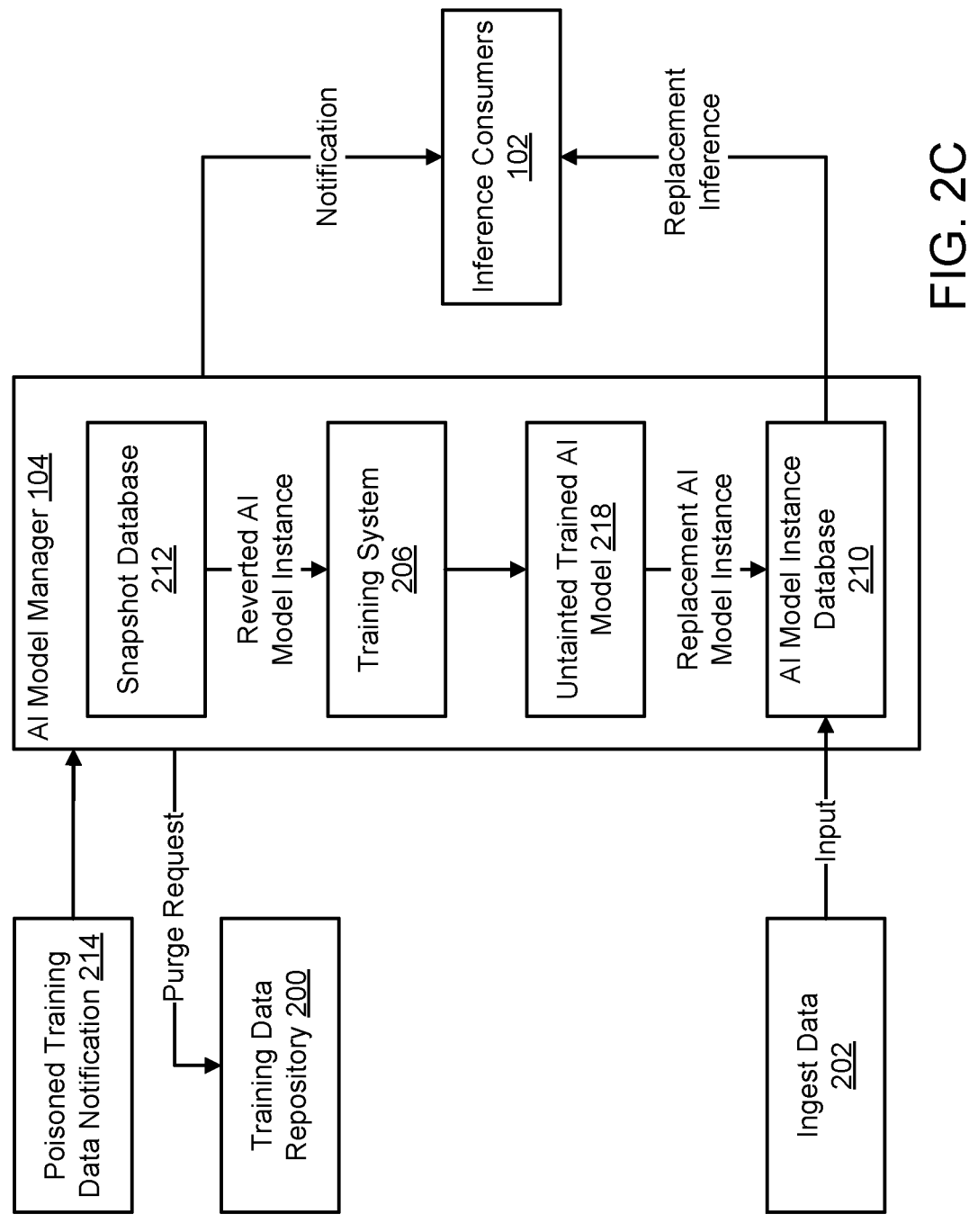
FIG. 2C shows a data flow diagram illustrating an AI model management system managing poisoned training data in accordance with an embodiment.

Turning to FIG. 2C, in the event that a poisoned training dataset is used to update an instance of the AI model, AI model manager 104 may obtain poisoned training data notification 214. Poisoned training data notification 214 may include information that identifies components associated with a trained AI model that are impacted by poisoned training data used to obtain the trained AI model.

The components may include (i) a poisoned portion of a training dataset, (ii) a tainted trained AI model instance associated with the poisoned portion of the training dataset, (iii) a poisoned inference associated with the tainted AI model instance, (iv) a time period associated with the poisoning (e.g., the time when the poisoned training data is introduced to the AI model, and/or the time the poisoning is remediated), and/or (v) a data source 100 that supplied the poisoned training data.

For example, in the context of facial recognition services, a poisoned portion of a training dataset may be an image of a person who has been incorrectly identified (e.g., incorrectly labeled). In this example, an incorrectly labeled image may be referred to as a "bad image". Training a facial recognition AI model using one or more bad images may result in a tainted facial recognition AI model that misclassifies ingested data (e.g., a picture displaying certain facial attributes) as being associated with persons that do not have the facial attributes and/or similar facial attributes included in the ingested data. The tainted facial recognition AI model may generate a poisoned inference that leads to an incorrect identification of a person depicted in a video.

Once the components are identified and to mitigate the impact of the components, AI model manager 104 may (i) send a notification to inference consumers 102 regarding the poisoned inference, (ii) send a purge request to training data repository 200 regarding the poisoned portion of the training dataset, and/or (iii) revert a tainted AI model instance to a previous AI model instance. The previous AI model instance may be a last known good AI model instance, and/or a previous tainted AI model instance trained by poisoned training data. In the case where the AI model instance is tainted, then the tainted AI model instance may later be untrained to eliminate the effect of the poisoned training data.

A snapshot of a last known good AI model instance may be stored in snapshot database 212. The last known good AI model instance may be a partially trained AI model instance that has not been trained using the poisoned portion of training data. For example, when an AI model is updated over time (e.g., when additional training data becomes available), the AI model may be sequentially updated using the additional training data. However, once trained with poisoned training data, all subsequent instances of the AI model may remain poisoned (i.e., retraining/updating may not remove the effect of the poisoned training data on the future operation of the trained AI model). The last known good AI model instance may be the last version of the AI model that is trained without using the poisoned training data for updating purposes.

However, reverting the AI model may not entirely remove the impact of the poisoned training data from the overall system operation. For example, the poisoned training data may still be present in training data repository 200. To reduce the impact of poisoned training data, a purge request may prompt the deletion of a poisoned portion of a training dataset from training data repository 200. Any number of poisoned portions of training data may be removed from training data repository 200 to create updated training data repository 216, shown in FIG. 2D. Updated training data repository 216 may not include any portions of poisoned training data. An updated training dataset from updated training data repository 216 may be used to train an untainted AI model instance that is trustworthy for inference generation.

Figure 2D:
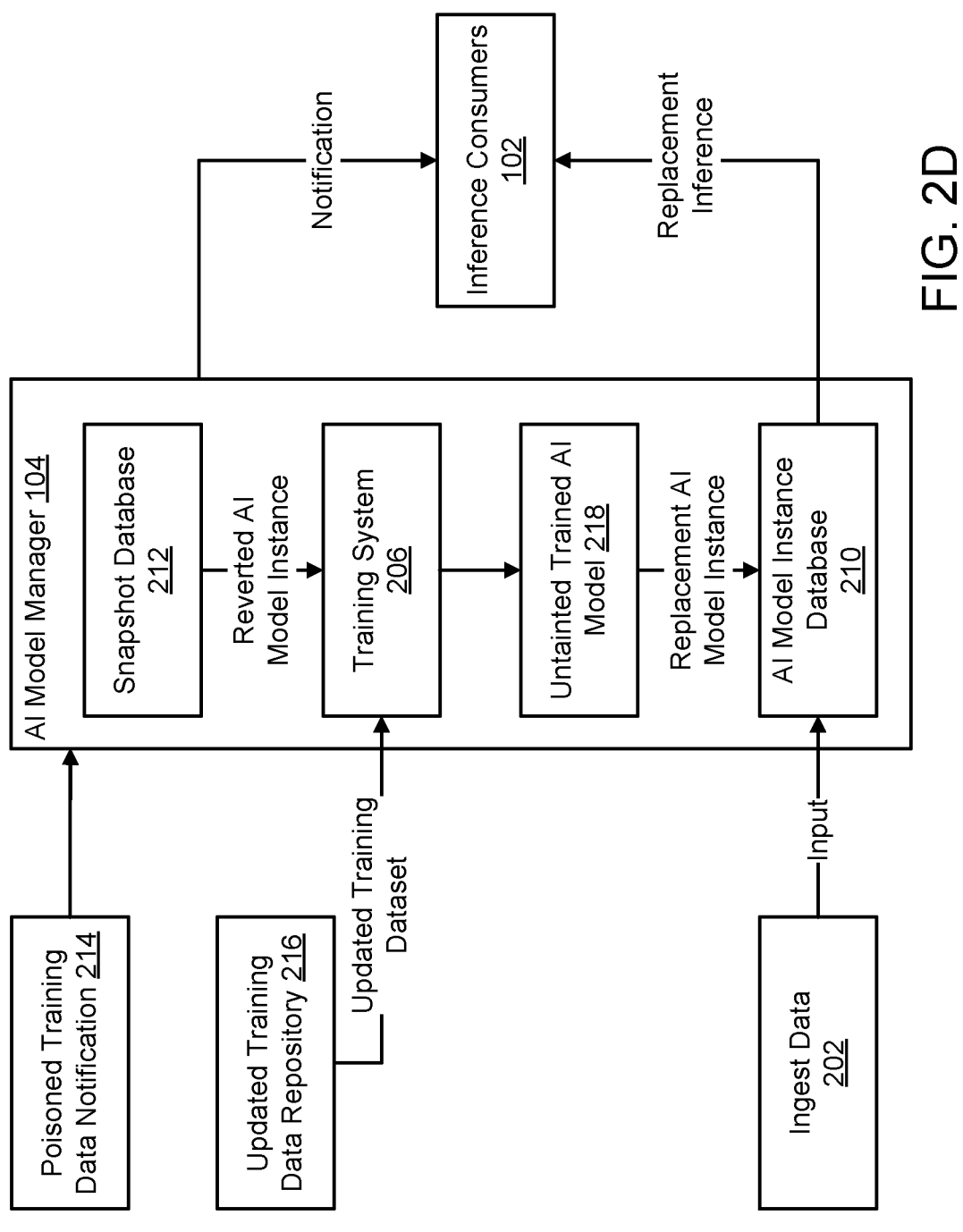
FIG. 2D shows a data flow diagram illustrating an AI model management system managing and remediating poisoned training data in accordance with an embodiment.

Keeping with FIG. 2D, to obtain untainted trained AI model 218, training system 206 may use an updated training dataset to train a reverted AI model instance (e.g., a last known good AI model instance). To reduce computational resources during AI model training, the updated training dataset used to train a reverted AI model instance may only include training data not already used to train the reverted AI model instance (e.g., training data input to training system 206 after the poisoned training data). AI model manager may then replace a tainted trained AI model instance stored in AI model instance database 210 with untainted trained AI model 218.

Like removal of the poisoned training data to reduce the impact of the poisoned training data on operation of the system, untainted trained AI model 218 may be used to generate a replacement inference for a poisoned inference (e.g., generated by the tainted trained AI model) by ingesting a portion of ingest data 202 (e.g., which may have been used to generate the poisoned inference). AI model manager 104 may then provide the replacement inference to inference consumers 102 and/or otherwise use the replacement inference to reduce the impact of the poisoned inference.

For example, returning to the facial recognition services example, AI model manager 104 may send a notification to law enforcement (e.g., an inference consumer) regarding the incorrect identification of the person, and training data repository 200 may be updated by removing the one or more bad images. Consequently, updated training data repository 216 may be used to train a reverted facial recognition AI model (e.g., a last known good facial recognition AI model) without the impact of the poisoned training data. The reverted facial recognition AI model may be trained using only the portion of images and/or video from the updated training data repository that have not been previously used to update the reverted facial recognition AI model. Once trained, the untainted facial recognition AI model may ingest the video depicting the person and send an updated identification to law enforcement.

While a facial recognition service example is supplied to help describe FIGS. 2A-2D, it should be appreciated that the data flows illustrating AI model management in FIGS. 2A-2D may be used to achieve other types of goals without departing from embodiments disclosed herein.

Figure 3C:
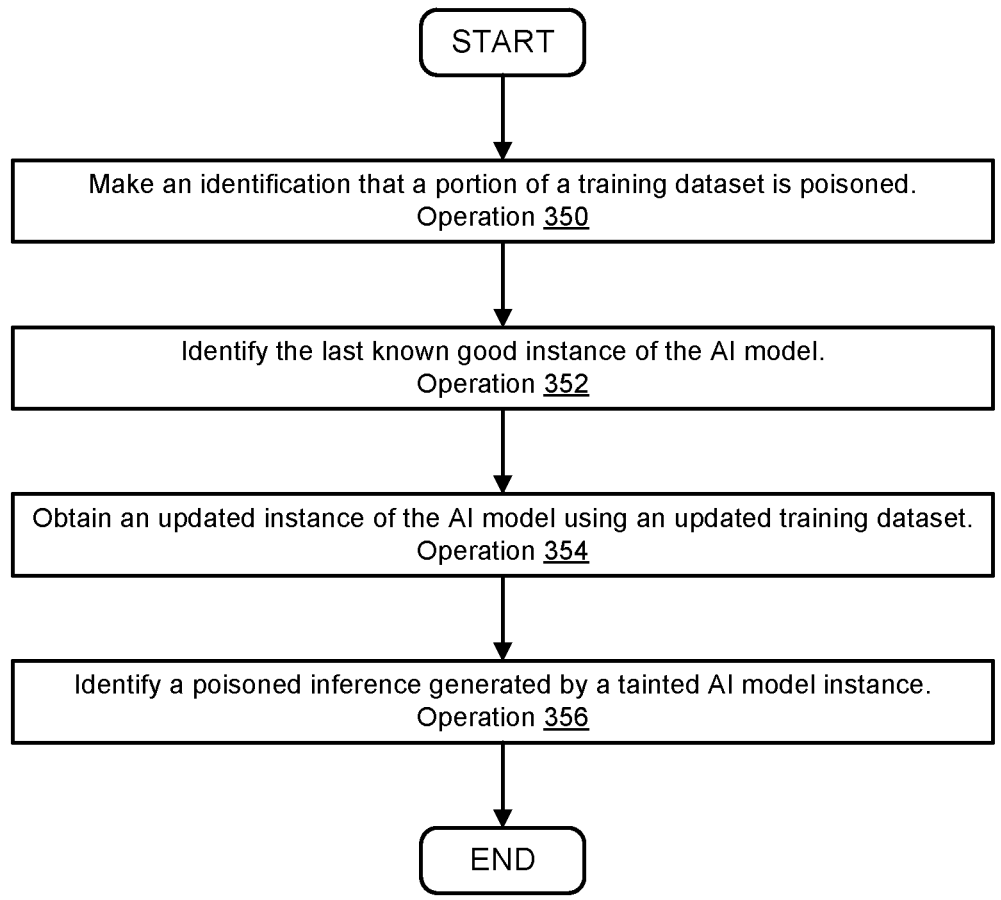
FIG. 3C shows a flow diagram illustrating a method of managing poisoned training data in accordance with an embodiment.

As discussed above, the components of FIG. 1 may perform various methods to manage AI models. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of updating an AI model instance in accordance with an embodiment is shown. The method may be performed by a data processing system, and/or another device.

At operation 300, an AI model and a training dataset may be obtained. The AI model may be obtained by (i) reading the AI model from storage, (ii) receiving the AI model from another device, and/or (iii) generating the AI model, for example by programming a data processing system and/or another device. The AI model may be a particular type of AI model, such as a linear regression model, a deep neural network, a decision tree, etc.

The type of AI model obtained may depend on the goals of inference consumers and/or other factors such as (i) training dataset characteristics (e.g., data type, size and/or complexity), (ii) cost limitations (e.g., the cost to train and/or maintain the AI model), (iii) time limitations (e.g., the time to train the AI model and/or for inference generation), and/or (iv) inference characteristics (e.g., accuracy and/or inference type). For example, a complex AI model such as a muti-layered neural network may process a large amount of complex data and generate highly accurate inferences, but may be costly to train and maintain and may have low explainability (e.g., may act as a "black box"). In contrast, a linear regression model may be a simpler, less costly AI model with high explainability, but may only be well-suited for data whose labels are linearly correlated with the selected features, and may generate less accurate inferences than a neural network.

The training dataset may be obtained by (i) reading the training dataset from storage, (ii) receiving the training dataset from another device, and/or (iii) generating the training dataset, for example, by gathering and measuring information from one or more data sources. The training dataset may include labeled data or unlabeled data. Training data included in the training dataset may be processed, cleansed and/or evaluated for quality in order to prepare the training dataset for use in training AI models.

At operation 302, a trained AI model instance may be obtained using the AI model and the training dataset. The trained AI model may be obtained by training the AI model to relate pieces of data (e.g., an input and an output) from the training dataset using a training system, such as the one in FIGS. 2A-2D. To do so, the training dataset and the AI model may be input to the training system.

The training system may employ machine learning techniques such as supervised learning, unsupervised learning, semi-supervised learning, etc. As part of the training process, the AI model may undergo a validation and/or testing step to improve and/or measure the reliability of generated inferences.

At operation 304, an inference is obtained using the trained AI model instance and an ingest dataset. The inference may be obtained by feeding ingest data collected from one or more data sources to the trained AI model instance. The trained AI model instance may produce the inference as output in response to the ingest data.

The inference may be received by an AI model management system which may then provide the inference to inference consumers. An inference consumer may use the provided inference to help with decision-making and/or problem-solving. Any number of inferences may be obtained from the trained AI model instance and provided to inference consumers until the trained AI model instance is replaced with an updated AI model instance.

At operation 306, a determination is made regarding whether an update condition is satisfied. The determination may be made by comparing characteristics of the trained AI model, characteristics of available training data, and/or other characteristics to corresponding conditions that, if met, indicate that the update condition is satisfied.

For example, the update condition may be satisfied if (i) a sufficient amount of approved new training data has been gathered for updating purposes (e.g., based on comparison to a training data threshold), (ii) the AI model inference accuracy is unsatisfactory (e.g., based on a comparison to an inference accuracy threshold), (iii) an AI model is updated according to a schedule that fits business needs (e.g., based on a comparison between when the trained AI model was last updated and the current point in time), and/or (iv) other basis of comparison between the current characteristics of the AI model, training data, etc. Refer to FIG. 3B for additional details regarding whether to update an instance of the AI model.

If at operation 306 the update condition is not satisfied, then the method may return to operation 304 (e.g., thereby allowing for another inference to be obtained using the currently trained AI model instance and available ingest data). However, if the update condition is satisfied, then the method may proceed to operation 308.

At operation 308, a snapshot of the trained AI model instance is obtained. The snapshot of the trained AI model instance may be obtained by (i) reading the snapshot from storage, (ii) obtaining the snapshot from another device, and/or (iii) by generating the snapshot.

The snapshot may be generated by storing, in a non-transitory storage medium, (i) a copy of the structure of the instance of the AI model, (ii) metadata for the inferences obtained from the instance of the AI model, the metadata indicating an inference consumer that has consumed the inference, (iii) a copy of the portion (and/or metadata for accessing an archived portion) of the training dataset used to train the instance of the AI model, and/or (iv) metadata identifying data sources from which training data has been collected.

The structure of the instance of the AI model may be stored by (i) storing a copy of the architecture of the AI model and parameters (e.g., weights for the hidden layers) that may change as the AI model is modified over time, or (ii) storing a reference to the architecture (if previously stored) and the parameters of the AI model. For example, when first stored, both the architecture of the AI model (e.g., which may include a description of the neurons, bias function descriptions, activation function descriptions, etc.) and the parameters may be stored. However, as the AI model is evolved, the structure may be stored as part of the snapshot by merely referencing the existing stored architecture and storing the changed parameters.

The parameters may include, for example, a first element from a hidden layer of the instance of the AI model (e.g., the process may be extended until all weights for the instance of the AI model are stored). Additionally, metadata regarding the structure of the instance of the AI model may also be stored to facilitate identification of the instance of the AI model and/or for other purposes.

An initial snapshot of an AI model may include information that may remain static throughout the life of the AI model (e.g., the structure of the AI model), whereas subsequent snapshots may only include dynamic information (e.g., weights).

The metadata for the inference may be stored by storing an identifier for an input used to obtain the inference, an identifier for the inference, identification information for the inference consumer, and/or a time stamp indicating when the inference was generated. Any number of snapshots of AI model instances may be stored in a snapshot database.

By storing the snapshot of an AI model instance, the snapshot may be used to (i) reduce the computational costs for reverting a poisoned AI model instance to a previous AI model instance that is unpoisoned (e.g., not trained using poisoned data), (ii) mitigate the effects of a poisoned inference provided to inference consumers, and/or (iii) purge poisoned training data from a training data repository to avoid poisoning any updated AI models that may be updated (e.g., trained) using the poisoned training data. However, if poisoned training data is not identified, AI models may be continuously updated (e.g., trained) as updated training data (e.g., new training data) is made available.

At operation 310, an updated AI model instance is obtained using an updated training dataset. The updated AI model instance may be obtained by further training (e.g., updating) the trained AI model instance to relate pieces of data from an updated training dataset using a training system. The updated training dataset may include newly acquired training data (e.g., training data that has not already been used to train the trained AI model instance).

The training system may employ machine-learning methods such as incremental learning, which may allow an additional training step as new training data becomes available, and may adjust what has already been learned by the AI model according to the new training data. Traditional machine learning methods may assume the availability of a sufficient training dataset before the first training process begins and may not allow for adjustments when only new training data is introduced. In either case, at the time poisoned training data is introduced into the training dataset, the subsequently trained and/or updated AI models may be affected by the poisoned training data, requiring reverting to an AI model that has not been trained using poisoned training data.

The method may end following operation 310.

Turning to FIG. 3B, a flow diagram illustrating a method of determining whether to update an instance of the AI model in accordance with an embodiment is shown. The operations in FIG. 3B may be an expansion of operation 306 in FIG. 3A. The method may be performed by AI model manager 104, data sources 100, inference consumers 102, and/or any other entity without departing from embodiments disclosed herein.

At operation 320, a candidate training data set and a historical training data set are obtained. The candidate training data set may be obtained by requesting the candidate training data set from a data source (e.g., any of data sources 100) and/or any other entity. The candidate training data set may also be obtained via an automatic transmission from a data source in accordance with a data transmission schedule or other plan for updating the AI model. The candidate training data set may be obtained in response to an identification that an update condition is met for the AI model. The identification may be made by evaluating characteristics of data sets obtained from data sources (e.g., data sources 100), characteristics of the inferences generated by the AI model, and or other data and determining that the data meets certain criteria. The identification may also be made by receiving a request for re-training.

The historical training data set may be obtained in response to obtaining the candidate training data set, at regular intervals, and/or upon request. The historical training data set may include all training data previously used to train an instance of the AI model. The historical training data set may be obtained from a data source, from a training data repository (e.g., training data repository 200), and/or any other source.

At operation 322, an analysis is performed of the candidate training data set and the historical training data set to obtain a score.

In a first example, the analysis may include: (i) performing a cluster analysis of the historical training data set to obtain a set of clusters, (ii) identifying a first data value of the candidate training data set, (iii) determining whether the first data value falls within the set of clusters.

To perform the cluster analysis of the historical training data set, a listing of data values included in the historical training data set may be obtained. The data values in the listing of data values may be grouped into clusters. The clusters may be determined based on any metric to establish a relationship between the data values included in a cluster. For example, the cluster analysis may include a density-based spatial clustering of applications with noise (DBSCAN) process. The DBSCAN process may identify clusters based on high density areas of the data values in the historical training data set when the data values are represented spatially on a graph.

The cluster analysis may also include assigning clusters based on a threshold distance between data values and their nearest neighbor data values. The cluster analysis may be performed based on other relationships between data values (e.g., statistical distributions) without departing from embodiments disclosed herein. The result of the cluster analysis may include a graphical representation of the set of clusters. The graphical representation of the set of clusters may include the data values and boundaries around each cluster to indicate which data values belong to each cluster.

Figure 4A:
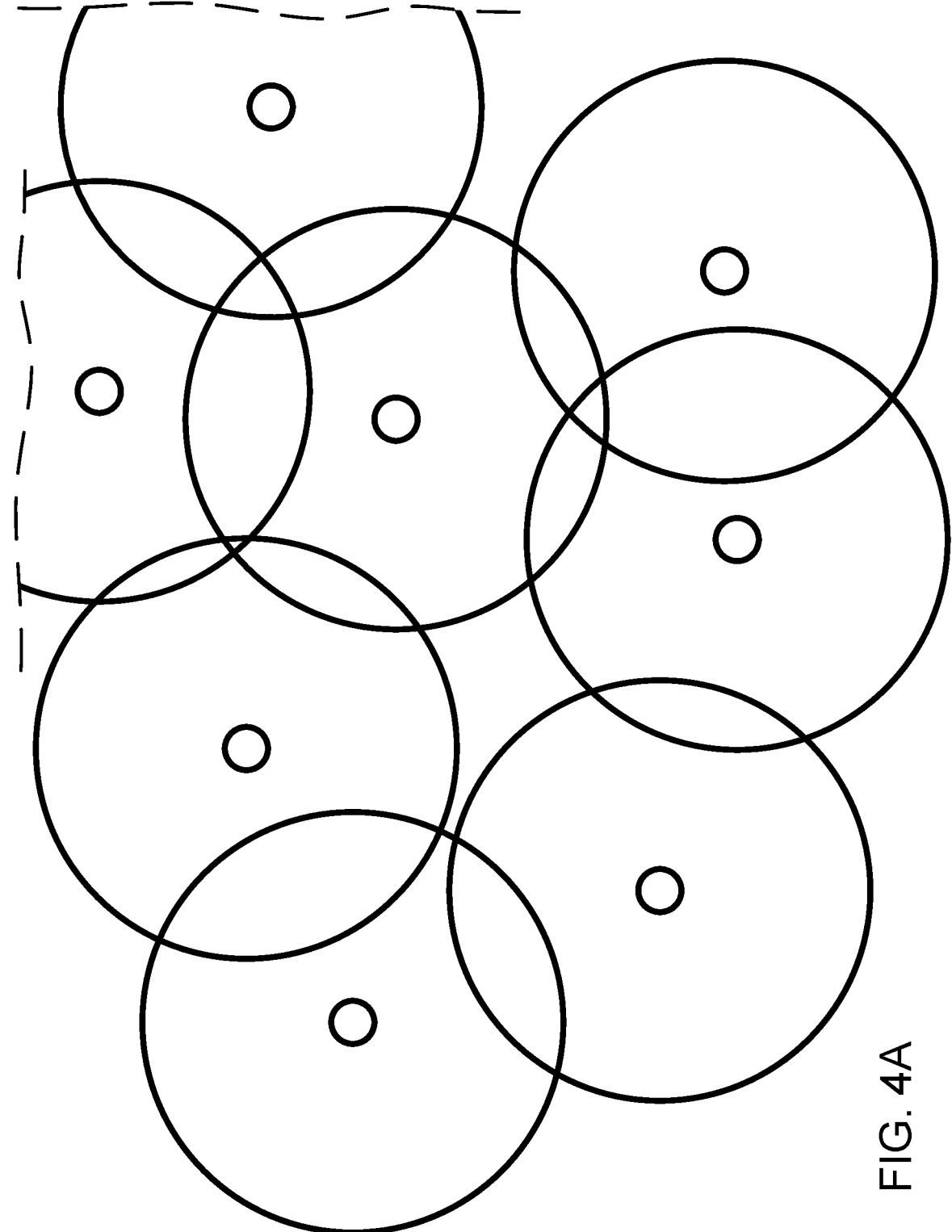
FIGS. 4A-4C show a graphical representation of a cluster analysis performed using candidate training data and historical training data in accordance with an embodiment.
Figure 4B:
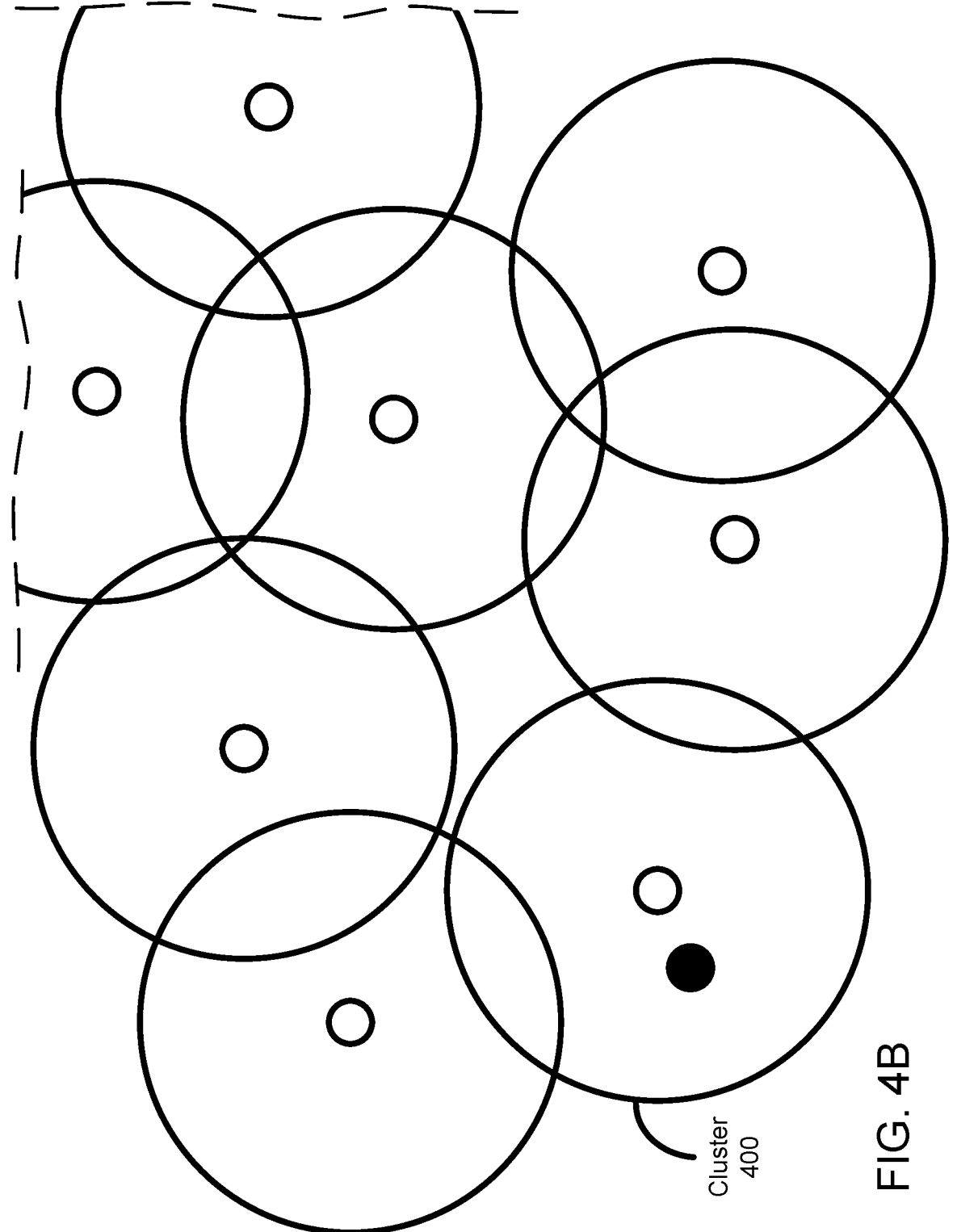
Figure 4C:
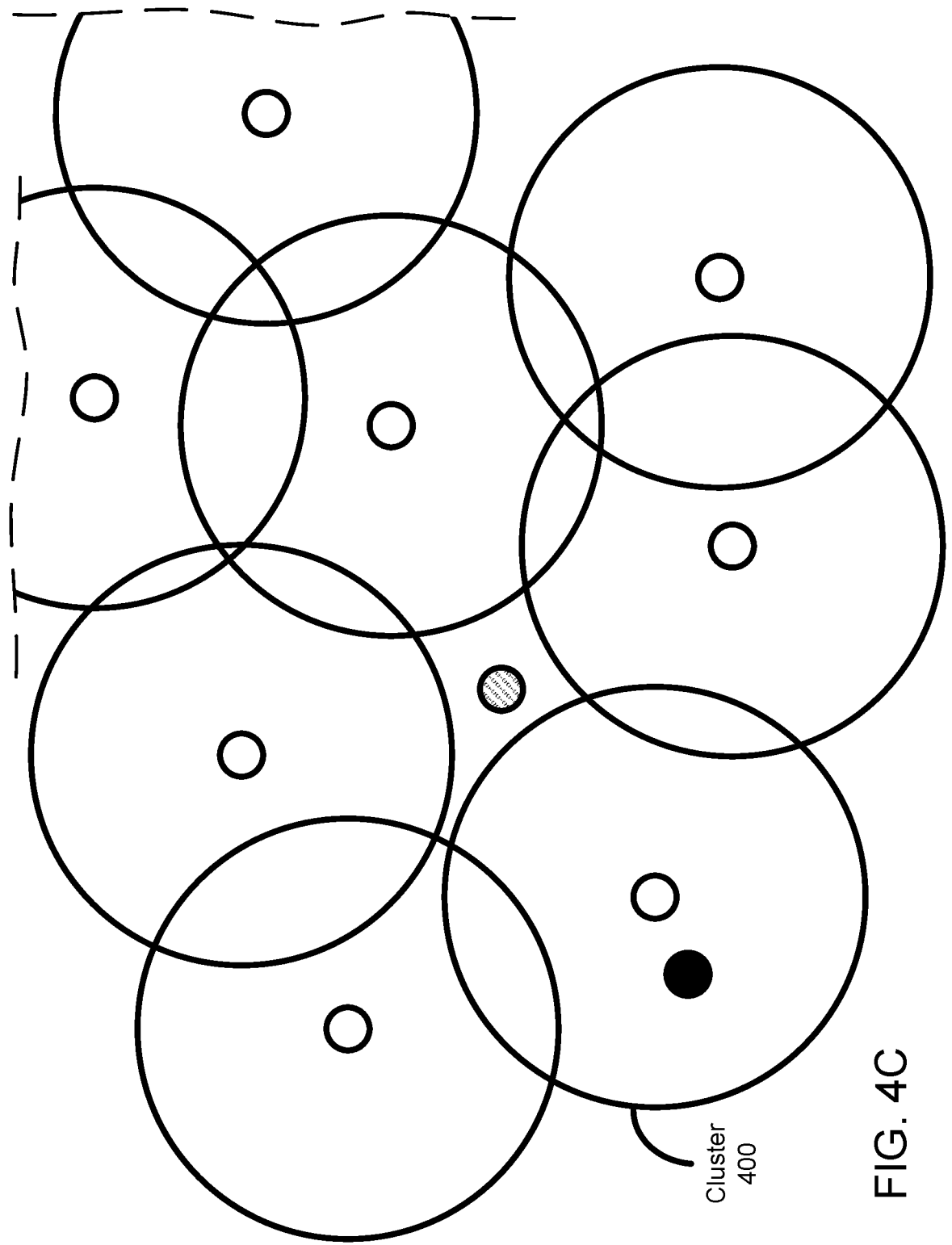

For example, the radii of the clusters (e.g., if uniform in size and circular) may be set so that the cluster analysis identifies no clusters in the historical (e.g., known good) training data set initially. By doing so, the data values of the historical training data set may be determined to be sufficiently dissimilar from one another. Radii of clusters may also be set to limit membership in the clusters to a threshold number of data values (and/or a threshold density of data values) based on the known good data in the historical training data set and/or based on other parameters. Refer to FIGS. 4A-4C for an example of a graphical representation of a cluster analysis.

The first data value of the candidate training data set may be identified by obtaining a listing of the data values in the candidate training data set (e.g., from a data source, from storage, etc.) and selecting a first data value from the listing of the data values. The first data value may be selected at random, may be the first data value in the listing, and/or may be selected via other methods.

To determine whether the first data value falls within the set of clusters, the first data value may be compared to each cluster of the set of clusters. To compare the first data value to each cluster of the set of clusters, a comparison may be made between the first data value and a bounding area of a respective cluster to determine whether the first data value falls within the respective cluster. The bounding area may be defined by a point and a radius that extends about the point thereby establishing the bounding area.

To compare the first data value to the bounding area of a respective cluster, the first data value may be superimposed on the graphical representation of the set of clusters. If the first data value falls within a bounding area of a cluster, the first data value may be considered to fall within the bounding area of the cluster. If the first data value falls within the respective cluster, the first data value may be considered as falling within the set of clusters.

In an example where the clusters are circular and the radii of the clusters were set so that the cluster analysis identified no clusters in the historical training data set, a cluster analysis may be performed following addition of the first data value. If any clusters are identified by a second cluster analysis process, the first data value may be considered similar to at least one data value in the historical training data set and the score may be increased.

If the first data value falls within the set of clusters, the score may be increased. To increase the score, a numerical representation of the score may be modified to reflect a higher score. The score may be increased via other methods to reflect a higher likelihood that the candidate training data includes poisoned training data without departing from embodiments disclosed herein.

If the first data value does not fall within the set of clusters, the score may be decreased. As previously mentioned, to decrease the score, a numerical representation of the score may be modified and/or any other means of representing the likelihood that the candidate training data set includes poisoned training data may be modified. If the first data value does not fall within the set of clusters, the first data value may also be approved for AI model training purposes. To approve the first data value, the first data value may be stored in an approved training data repository. The first data value may also be temporarily stored until all data values of the candidate training data set have been evaluated for approval.

In a second example, performing the analysis may include: (i) identifying a first data value of the candidate training data set, (ii) obtaining a similarity measure between the first data value and each data value of the historical training data set to obtain a set of similarity measures, and (iii) determining whether each similarity measure of the set of similarity measures exceeds a similarity measure threshold.

The first data value of the candidate training data set may be identified as described above.

The similarity measure may be obtained by: (i) determining a Euclidean distance between the first data value and each data value of the historical training data set, (ii) determining a cosine similarity between the first data value and each data value of the historical training data set, (iii) determining a Manhattan distance between the first data value and each data value of the historical training data set, and/or (iv) determining any other indication of similarity between the first data value and each data value of the historical training data set. The set of similarity measures may include, for example, a listing of the previously determined similarity measures (e.g., a listing of Euclidean distances).

To determine whether each similarity measure of the set of similarity measures exceeds a similarity measure threshold, the similarity measure (e.g., the Euclidean distance, cosine similarity, Manhattan distance, etc.) may be compared to a similarity measure threshold. The score may also be transmitted to another entity responsible for comparing the score to the score threshold. An indication of whether the score exceeds the score threshold may be received in response to this transmission.

If at least a portion of the set of similarity measures exceeds the similarity measure threshold, the score may be increased. To increase the score, a numerical representation of the score may be modified to reflect a higher score. The score may be increased via other methods to reflect a higher likelihood that the candidate training data includes poisoned training data without departing from embodiments disclosed herein.

If at least a portion of the set of similarity measures does not exceed the similarity measure threshold, the score may be decreased. To decrease the score, a numerical representation of the score may be modified to reflect a lower score. The score may be decreased via other methods to reflect a lower likelihood that the candidate training data includes poisoned training data without departing from embodiments disclosed herein.

At operation 324, it is determined whether the score exceeds a score threshold. To do so, the score may be compared to the score threshold. The score may also be transmitted to another entity responsible for comparing the score to a score threshold. If the score exceeds the score threshold, the method may proceed to operation 326. If the score does not exceed the score threshold, the method may proceed to operation 328.

At operation 326, the candidate training data set is treated as including poisoned training data. An action set may be performed in response to the determination that the candidate training data set includes poisoned training data. The action set may include one or more of: (i) removing the first training data set from consideration as training data for the AI model, (ii) treating the first training data set as being part of a malicious attack, (iii) discarding the first training data set, (iv) identifying a data source of the first training data set, and/or (iv) treating the data source of the first training data set as a potentially malicious data source.

To remove the candidate training data set from consideration as training data for the AI model, the candidate training data set may be re-labeled as poisoned training data. The poisoned training data may be stored separately and/or may be discarded as described below. In addition, a notification that the candidate training data set is to be removed from consideration as training data for the AI model may be transmitted to an entity responsible for updating (re-training) the AI model.

To treat the candidate training data as being part of a malicious attack, a notification of the malicious attack may be transmitted to a downstream consumer and/or other entity responsible for responding to and remediating malicious attacks. The notification of the malicious attack may trigger an action set to further investigate and/or remediate the malicious attack.

The candidate training data may be discarded by deleting all copies of the candidate training data, storing the candidate training data set in storage (locally or offsite) and/or via other methods.

To identify a data source of the candidate training data set, metadata associated with the candidate training data may be obtained. The metadata may include information such as the data source of the candidate training data and a time stamp for when the candidate training data set was obtained. The metadata may be obtained by accessing a metadata database. The metadata database may include each data value of each data set obtained from data sources and the metadata associated with each data value.

To treat the data source of the candidate training data set as a potentially malicious data source, the metadata associated with the candidate training data set may be modified to include a warning of potentially poisoned training data originating from the data source. Future training data transmitted from the data source may be subject to additional scrutiny to detect poisoned training data and/or may be automatically removed from consideration. In addition, the data source may be blocked from all future data transmissions.

The method may end following operation 326.

Returning to operation 324, the method may proceed to operation 328 if the score does not exceed the score threshold. At operation 328, the candidate training data set is treated as not including poisoned training data. To treat the candidate training data set as not including poisoned training data, the instance of the AI model may be updated using the candidate training data set to obtain a new instance of the AI model. To do so, a re-training process may be performed on the AI model using the candidate training data set as training data. The new instance of the AI model may be the result of the re-training process and may be more likely to faithfully predict the outputs included in the candidate training data set when the input values included in the candidate training data set are used as ingest for the new instance of the AI model.

In addition, the candidate training data set may be added to the historical training data set. To do so, the data values associated with the candidate training data set may be copied to a listing of data values associated with the historical training data set. By doing so, the candidate training data set may be considered as previously used to train an instance of the AI model (and, therefore, considered as having an acceptably low likelihood of including poisoned training data). The updated historical training data set may be used to evaluate similarities between future candidate training data sets and the updated historical training data set.

The method may end following operation 328.

Turning to FIG. 3C, a flow diagram illustrating a method of managing poisoned training data in accordance with an embodiment is shown. The method may be performed by a data processing system, and/or another device.

At operation 350, an identification is made that a portion of a training dataset is poisoned. The identification may be made by (i) receiving the identification from another entity, (ii) reading the identification from storage, and/or (iv) generating the identification. The identification may be generated, for example, by performing various analysis of training data and/or operation of entities from which the training data may be obtained.

At operation 352, the last known good instance of the AI model is identified. The last known good instance of the AI model may be identified by identifying the first AI model instance trained using the poisoned training dataset, identifying a second AI model instance trained before the first AI model instance (e.g., that is not trained using the poisoned training dataset), and using the second AI model instance as the last known good instance of the AI model.

At operation 354, an updated instance of the AI model is obtained using an updated training dataset. The updated training dataset may be obtained by reading training data from an updated training data repository. The updated training data repository may be obtained by removing the identified poisoned training dataset (e.g., from operation 350) from an existing training data repository so that the updated training repository may be free of poisoned training data.

The updated instance of the AI model may be obtained by further training (e.g., updating) the last known good instance of the AI model from operation 352. The updated instance of the AI model may be trained to relate pieces of data from the updated training dataset from operation 354, using a training system, (e.g., analogous to operations 302 and 310). The resulting trained updated instance of the AI model may be used to obtain unpoisoned inferences (e.g., replacement inferences and/or new inferences).

At operation 356, a poisoned inference is identified. The poisoned inference may be identified by accessing information stored in a snapshot of a tainted AI model instance. The snapshot of the tainted AI model instance may include associations (e.g., stored metadata) between the tainted AI model and any inference (e.g., a poisoned inference) generated by the tainted AI model. Once identified, the poisoned inference may be remediated.

The poisoned inference may be remediated by (i) notifying an inference consumer that consumed the poisoned inference, of the poisoned inference, (ii) obtaining a replacement inference (e.g., using the last known good instance of the AI model and the ingest dataset used to obtain the poisoned inference), (iii) providing the replacement inference to an inference consumer that consumed the poisoned inference, (iv) deleting the poisoned inference from an inference repository, and/or (v) retaining the unpoisoned inference.

The method may end following operation 356.

Turning to FIGS. 4A-4C, these figures may illustrate a graphical representation of a cluster analysis performed when analyzing a candidate training data set. Consider a scenario in which a candidate training data set is being evaluated to determine the likelihood that the candidate training data set includes poisoned training data. To do so, a historical training data set (e.g., a data set including all data values previously used to train an instance of an AI model) may be obtained. A cluster analysis (e.g., a DBSCAN process) may be performed on the historical training data set.

Turning to FIG. 4A, a radius of each cluster may be manually set so that the cluster analysis identifies no clusters in this historical training data set. While illustrated in FIG. 4A as being circular for simplicity of explanation, it will be appreciated that clusters may have more complicated shapes without departing from embodiments disclosed herein. FIG. 4A shows a circle of a fixed radius around each data value in the historical training data set. As only one data value falls within each circle, no clusters may be identified. Clusters may be represented as other shapes (e.g., an amorphous boundary, etc.) without departing from embodiments disclosed herein. Any data value in the candidate training data set that falls within the boundary of any circle in FIG. 4A may form a cluster and, therefore, may be considered similar enough to the historical training data set to increase a score associated with the candidate training data set.

Turning to FIG. 4B, a first data value of the candidate training data set (e.g., the filled-in circle) is superimposed on the graphical representation of the historical training data set. The first data value is shown as falling within the boundary of one of the circles and, therefore, cluster 400 is formed. By doing so, the score associated with the candidate training data set may be increased. The first data value may, therefore, be considered as including poisoned training data.

Turning to FIG. 4C, a second data value of the candidate training data (e.g., the striped circle) is superimposed on the graphical representation. The second data value is shown as not falling within the boundaries of cluster 400 or any other circle representing potential clusters. Therefore, the score associated with the candidate training data set may be decreased. The second data value may, therefore, have a lower likelihood of including poisoned training data and may be approved for use as training data for an instance of an AI model.

Figure 5:
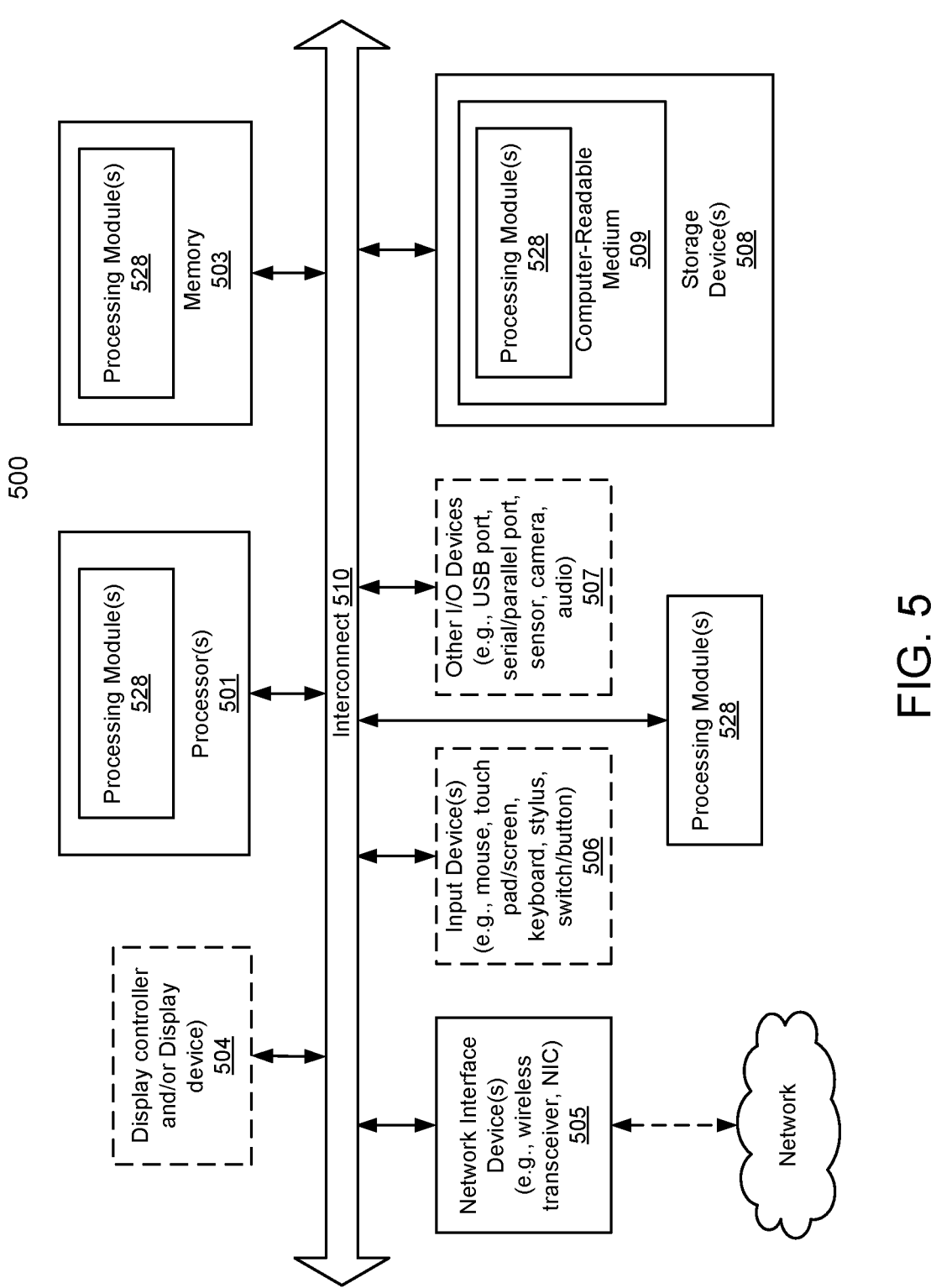
FIG. 5 shows a block diagram illustrating a data processing system in accordance with an embodiment.

Any of the components illustrated in FIGS. 1-2D may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high-level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random-access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs, or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing an artificial intelligence (AI) model, the method comprising:

obtaining a candidate training data set usable to update an instance of the AI model;

prior to updating the instance of the AI model using the candidate training data set:

identifying a historical training data set, the historical training data set being obtained prior to the candidate training data set and the historical training data set already having been used to train the instance of the AI model;

performing an analysis of the candidate training data set and the historical training data set to obtain a score reflecting a likelihood that the candidate training data set comprises poisoned training data, wherein a higher score indicates a higher likelihood that the candidate training data set comprises poisoned training data, wherein performing the analysis comprises:

identifying a first data value of the candidate training data set;

obtaining a similarity measure between the first data value and each data value of the historical training data set to obtain a set of similarity measures;

making a first determination regarding whether each similarity measure of the set of similarity measures exceeds a similarity measure threshold;

in a first instance of the first determination in which at least a portion of the set of similarity measures exceeds the similarity measure threshold, increasing the score; and in a second instance of the first determination in which at least a portion of the set of similarity measures does not exceed the similarity measure threshold, decreasing the score;

in response to the score exceeding a score threshold:

removing the candidate training data set from consideration as training data for the AI model;

treating the candidate training data set as being part of a malicious attack;

discarding the candidate training data set;

identifying a data source of the candidate training data set; and treating the data source of the candidate training data set as a potentially malicious data source.

2. The method of claim 1, wherein performing the analysis comprises:

performing a cluster analysis of the historical training data set to obtain a set of clusters;

identifying a first data value of the candidate training data set;

making a second determination regarding whether the first data value falls within the set of clusters;

in a first instance of the second determination in which the first data value falls within the set of clusters:

increasing the score; and in a second instance of the second determination in which the first data value does not fall within the set of clusters:

decreasing the score; and approving the first data value for AI model training purposes.

3. The method of claim 2, wherein making the second determination comprises:

for each of the clusters of the set of clusters:

making a comparison between the first data value and a bounding area of a respective cluster to determine whether the first data value falls within the respective cluster; and in an instance of the comparison in which the first data value falls within the respective cluster, concluding that the first data value falls within the set of clusters.

4. The method of claim 3, wherein the bounding area is defined by a point and a radius that extends about the point thereby establishing the bounding area.

5. The method of claim 1, wherein the similarity measure comprises one selected from a group consisting of:

a Euclidean distance;

a cosine similarity; and a Manhattan distance.

6. The method of claim 1, further comprising:

prior to obtaining the candidate training data set, making an identification that a re-training condition is met for the AI model.

7. A non-transitory machine-readable medium having instructions stored therein, which when executed by a processor, cause the processor to perform operations for managing an artificial intelligence (AI) model, the operations comprising:

obtaining a candidate training data set usable to update an instance of the AI model;

prior to updating the instance of the AI model using the candidate training data set:

identifying a historical training data set, the historical training data set being obtained prior to the candidate training data set and the historical training data set already having been used to train the instance of the AI model;

performing an analysis of the candidate training data set and the historical training data set to obtain a score reflecting a likelihood that the candidate training data set comprises poisoned training data, wherein a higher score indicates a higher likelihood that the candidate training data set comprises poisoned training data, wherein performing the analysis comprises:

identifying a first data value of the candidate training data set;

obtaining a similarity measure between the first data value and each data value of the historical training data set to obtain a set of similarity measures;

making a first determination regarding whether each similarity measure of the set of similarity measures exceeds a similarity measure threshold;

in a first instance of the first determination in which at least a portion of the set of similarity measures exceeds the similarity measure threshold, increasing the score; and in a second instance of the first determination in which at least a portion of the set of similarity measures does not exceed the similarity measure threshold, decreasing the score;

in response to the score exceeding a score threshold:

removing the candidate training data set from consideration as training data for the AI model;

treating the candidate training data set as being part of a malicious attack;

discarding the candidate training data set;

identifying a data source of the candidate training data set; and treating the data source of the candidate training data set as a potentially malicious data source.

8. The non-transitory machine-readable medium of claim 7, wherein performing the analysis comprises:

performing a cluster analysis of the historical training data set to obtain a set of clusters;

identifying a first data value of the candidate training data set;

making a second determination regarding whether the first data value falls within the set of clusters;

in a first instance of the second determination in which the first data value falls within the set of clusters:

increasing the score; and in a second instance of the second determination in which the first data value does not fall within the set of clusters:

decreasing the score; and approving the first data value for AI model training purposes.

9. The non-transitory machine-readable medium of claim 8, wherein making the second determination comprises:

for each of the clusters of the set of clusters:

making a comparison between the first data value and a bounding area of a respective cluster to determine whether the first data value falls within the respective cluster; and in an instance of the comparison in which the first data value falls within the respective cluster, concluding that the first data value falls within the set of clusters.

10. The non-transitory machine-readable medium of claim 9, wherein the bounding area is defined by a point and a radius that extends about the point thereby establishing the bounding area.

11. The non-transitory machine-readable medium of claim 7, wherein the similarity measure comprises one selected from a group consisting of:

a Euclidean distance;

a cosine similarity; and a Manhattan distance.

12. The non-transitory machine-readable medium of claim 7, wherein the operations further comprise:

prior to obtaining the candidate training data set, making an identification that a re-training condition is met for the AI model.

13. The non-transitory machine-readable medium of claim 12, wherein the candidate training data set is obtained in response to the identification.

14. A data processing system, comprising:

a processor; and a memory coupled to the processor to store instructions, which when executed by the processor, cause the processor to perform operations for managing an artificial intelligence (AI) model, the operations comprising:

obtaining a candidate training data set usable to update an instance of the AI model;

prior to updating the instance of the AI model using the candidate training data set:

identifying a historical training data set, the historical training data set being obtained prior to the candidate training data set and the historical training data set already having been used to train the instance of the AI model;

performing an analysis of the candidate training data set and the historical training data set to obtain a score reflecting a likelihood that the candidate training data set comprises poisoned training data, wherein a higher score indicates a higher likelihood that the candidate training data set comprises poisoned training data, wherein performing the analysis comprises:

identifying a first data value of the candidate training data set;

obtaining a similarity measure between the first data value and each data value of the historical training data set to obtain a set of similarity measures;

making a first determination regarding whether each similarity measure of the set of similarity measures exceeds a similarity measure threshold;

in a first instance of the first determination in which at least a portion of the set of similarity measures exceeds the similarity measure threshold, increasing the score; and in a second instance of the first determination in which at least a portion of the set of similarity measures does not exceed the similarity measure threshold, decreasing the score;

in response to the score exceeding a score threshold:

removing the candidate training data set from consideration as training data for the AI model;

treating the candidate training data set as being part of a malicious attack;

discarding the candidate training data set;

identifying a data source of the candidate training data set; and treating the data source of the candidate training data set as a potentially malicious data source.

15. The data processing system of claim 14, wherein performing the analysis comprises:

performing a cluster analysis of the historical training data set to obtain a set of clusters;

identifying a first data value of the candidate training data set;

making a second determination regarding whether the first data value falls within the set of clusters;

in a first instance of the second determination in which the first data value falls within the set of clusters:

increasing the score; and in a second instance of the second determination in which the first data value does not fall within the set of clusters:

decreasing the score; and approving the first data value for AI model training purposes.

16. The data processing system of claim 15, wherein making the second determination comprises:

for each of the clusters of the set of clusters:

making a comparison between the first data value and a bounding area of a respective cluster to determine whether the first data value falls within the respective cluster; and in an instance of the comparison in which the first data value falls within the respective cluster, concluding that the first data value falls within the set of clusters.

17. The data processing system of claim 16, wherein the bounding area is defined by a point and a radius that extends about the point thereby establishing the bounding area.

18. The data processing system of claim 14, wherein the similarity measure comprises one selected from a group consisting of:

a Euclidean distance;

a cosine similarity; and a Manhattan distance.

19. The data processing system of claim 14, wherein the operations further comprise:

prior to obtaining the candidate training data set, making an identification that a re-training condition is met for the AI model.

20. The data processing system of claim 19, wherein the candidate training data set is obtained in response to the identification.

* * * * *